(12) United States Patent
Reyes et al.

(10) Patent No.: US 8,071,063 B2
(45) Date of Patent: Dec. 6, 2011

(54) SEPARATION OF HYDROGEN FROM HYDROCARBONS UTILIZING ZEOLITIC IMIDAZOLATE FRAMEWORK MATERIALS

(75) Inventors: Sebastian C. Reyes, Branchburg, NJ (US); Jose G. Santiesteban, legal representative, Hellertown, PA (US); Zheng Ni, Clinton, NJ (US); Charanjit S. Paur, South Bound Brook, NJ (US); Pavel Kortunov, Flemington, NJ (US); John Zengel, Clinton, NJ (US); Harry W. Deckman, Clinton, NJ (US)

(73) Assignee: ExxonMobile Research and Engineering Company, Annandale, NJ (US)

( * ) Notice: Subject to any disclaimer, the term of this patent is extended or adjusted under 35 U.S.C. 154(b) by 171 days.

(21) Appl. No.: 12/322,363

(22) Filed: Jan. 30, 2009

(65) Prior Publication Data

US 2009/0211440 A1    Aug. 27, 2009

Related U.S. Application Data

(60) Provisional application No. 61/066,550, filed on Feb. 21, 2008.

(51) Int. Cl.
| | |
|---|---|
| B01D 53/02 | (2006.01) |
| B01D 53/04 | (2006.01) |
| B01D 53/047 | (2006.01) |
| B01D 53/22 | (2006.01) |
| C01B 3/50 | (2006.01) |
| C01B 3/56 | (2006.01) |
| C01B 33/20 | (2006.01) |
| C01B 39/04 | (2006.01) |
| C01B 39/02 | (2006.01) |
| B01J 20/26 | (2006.01) |

(52) U.S. Cl. ............... 423/248; 423/210; 423/245.1; 423/648.1; 423/700; 423/701; 423/702; 423/704; 423/705; 423/706; 423/708; 502/400; 502/401; 95/43; 95/45; 95/55; 95/90; 95/141; 95/143; 95/144; 95/145; 95/273; 95/274; 95/902

(58) Field of Classification Search ............ 423/210, 423/245.1, 248, 648.1, 700, 701, 702, 704, 423/705, 706, 708; 502/400, 401; 95/43, 95/45, 55, 90, 141, 143, 144, 145, 273, 274, 95/902

See application file for complete search history.

(56) References Cited

U.S. PATENT DOCUMENTS 3,885,927 A    5/1975    Sherman et al.
(Continued)

FOREIGN PATENT DOCUMENTS

DE    2926524    6/1979
(Continued)

OTHER PUBLICATIONS

Hideki Hayashi, Adrien P. Cote, Hiroyasu Furukawa, Michael O'Keeffe, Omar M. Yaghi, "Zeolite A imidazolate frameworks," Nature Materials, vol. 6, Jul. 2007, pp. 501-506.

(Continued)

*Primary Examiner* — Stuart Hendrickson
*Assistant Examiner* — Daniel Berns

(57) ABSTRACT

The present invention relates to the selective separation of hydrogen ("$H_2$") hydrocarbons in streams containing both hydrogen and hydrocarbons (e.g. methane, ethylene, ethane, propylene, propane, etc.) utilizing a zeolitic imidazolate framework ("ZIF") material. Preferably, the stream to be separated is fed to the present process in a substantially gaseous phase. In preferred embodiments, the current invention is utilized in either a pressure swing adsorption process, a temperature swing adsorption process, or a membrane separations process to separate hydrogen from hydrocarbons present in hydrogen production streams or petrochemical/petroleum refining product streams and intermediate streams.

28 Claims, 28 Drawing Sheets

ZIF-9 Adsorption Loading for Hydrogen and Various Hydrocarbons @ 301 K and 106.6 kPa

U.S. PATENT DOCUMENTS

| | | | |
|---|---|---|---|
| 4,775,396 | A | 10/1988 | Rastelli et al. |
| 4,857,078 | A | 8/1989 | Watler |
| 4,869,883 | A | 9/1989 | Thorogood et al. |
| 5,171,333 | A | 12/1992 | Maurer |
| 5,642,630 | A | 7/1997 | Abdelmalek et al. |
| 5,726,118 | A | 3/1998 | Ivey et al. |
| 5,753,011 | A | 5/1998 | Sircar et al. |
| 6,011,192 | A | 1/2000 | Baker et al. |
| 6,531,569 | B1 | 3/2003 | Tachiki et al. |
| 6,617,467 | B1 | 9/2003 | Müller et al. |
| 6,624,318 | B1 | 9/2003 | Müller et al. |
| 6,893,564 | B2 | 5/2005 | Mueller et al. |
| 6,929,679 | B2 | 8/2005 | Muller et al. |
| 6,930,193 | B2 | 8/2005 | Yaghi et al. |
| 7,056,482 | B2 | 6/2006 | Hakka et al. |
| 7,078,235 | B2 | 7/2006 | Spencer et al. |
| 7,196,210 | B2 | 3/2007 | Yaghi et al. |
| 7,202,385 | B2 | 4/2007 | Mueller et al. |
| 2002/0104435 | A1* | 8/2002 | Baker et al. ............... 95/45 |
| 2003/0004364 | A1 | 1/2003 | Yaghi et al. |
| 2003/0078311 | A1 | 4/2003 | Muller et al. |
| 2003/0148165 | A1 | 8/2003 | Muller et al. |
| 2003/0222023 | A1 | 12/2003 | Mueller et al. |
| 2004/0225134 | A1 | 11/2004 | Yaghi et al. |
| 2004/0249189 | A1 | 12/2004 | Mueller et al. |
| 2004/0265670 | A1 | 12/2004 | Muller et al. |
| 2005/0004404 | A1 | 1/2005 | Muller et al. |
| 2005/0124819 | A1 | 6/2005 | Yaghi et al. |
| 2005/0154222 | A1 | 7/2005 | Muller et al. |
| 2005/0192175 | A1 | 9/2005 | Yaghi et al. |
| 2006/0079725 | A1 | 4/2006 | Li et al. |
| 2006/0135824 | A1 | 6/2006 | Mueller et al. |
| 2006/0154807 | A1 | 7/2006 | Yaghi et al. |
| 2006/0185388 | A1 | 8/2006 | Muller et al. |
| 2006/0252641 | A1 | 11/2006 | Yaghi et al. |
| 2007/0068389 | A1 | 3/2007 | Yaghi |
| 2007/0202038 | A1 | 8/2007 | Yaghi et al. |
| 2008/0184883 | A1 | 8/2008 | Zhou et al. |

FOREIGN PATENT DOCUMENTS

| | | |
|---|---|---|
| EP | 0 700 708 A1 | 3/1996 |
| EP | 1 148 025 A1 | 10/2001 |
| EP | 0 790 263 B1 | 2/2002 |
| EP | 1 674 555 A1 | 12/2005 |
| EP | 1 383 775 B1 | 8/2006 |
| WO | WO 02/088148 A1 | 11/2002 |
| WO | WO 03/035717 A1 | 5/2003 |
| WO | WO 03/064030 A1 | 8/2003 |
| WO | WO 03/101975 A1 | 12/2003 |
| WO | WO 03/102000 A1 | 12/2003 |
| WO | WO 2004/037895 A1 | 5/2004 |
| WO | WO2004/101575 A2 | 11/2004 |
| WO | WO 2005/003069 A2 | 1/2005 |
| WO | WO 2005/003622 A1 | 1/2005 |
| WO | WO 2005/068474 A1 | 7/2005 |
| WO | WO 2006/028479 A1 | 3/2006 |
| WO | WO 2006/047423 A2 | 5/2006 |
| WO | WO 2006/050898 A1 | 5/2006 |
| WO | WO 2006/089908 A1 | 8/2006 |
| WO | WO 2006/110740 A2 | 10/2006 |
| WO | WO 2007/038508 A2 | 4/2007 |
| WO | WO 2007/101241 A2 | 9/2007 |

OTHER PUBLICATIONS

Rahul Banerjee, Anh Phan, Bo Wang, Carolyn Knobler, Hiroyasu Furukawa, Michael O'Keefe, Omar M. Yaghi, "High-Throughput Synthesis of Zeolitic Imidazolate Frameworks and Application of CO2 Capture," Science, vol. 319, Feb. 15, 2008, pp. 939-943.

Kyo Sung Park et al.; "Exceptional Chemical and thermal stability of zeolitic imidazolate frameworks," PNAS, Jul. 5, 2006, vol. 103, No. 27, pp. 10186-10191.

Yun-Qi Tian et al.; "The Silica-Like Extended Polymorphism of Cobalt (II) Imidazolate Three-Dimensional Frameworks: X-ray Single Crystal Structures and Magnetic Properties," Chem. Eur. J. 2003, 9, pp. 5673-5685.

Yun-Qi Tian et al.; "$[Co_5(im)_{10} \cdot 2MB]$•: A Metal-Organic Open-Framework with Zeolite-Like Topology," Angew. Chem. Int. Ed. 2002, 41, No. 8, pp. 1384-1386.

Xiao-Chun Huang et al., "Ligand-Directed Strategy for Zeolite-Type Metal-Organic Frameworks: Zinc(II) Imidazolates with Unusual Zeolitic Topologies," Angew. Chem. Int. Ed. 2006, 45, pp. 1557-1559.

Ziaochun Huang et al.; "$[Zn(bim)_x] \cdot (H_2O)_{1.67}$: A metal-organic open-framework with sodalite topology"; Chinese Science Bulletin, vol. 48, No. 15, Aug. 2003, pp. 1531-1534.

Yun-Qi Tian et al.; "Design and Generation of Extended Zeolitic Metal-Organic Frameworks (ZMOFs): Syntheis and Crystal Structures of Zinc(ii) Imidazolate Polymers with Zeolitic Topologies"; Chem. Eur. J., 2007, 13, pp. 4146-4154.

Yun-Qi Tian et al.; "$[Co^{II}Cu^{I}{}_2(Im)_4]\infty$:A Layered Bimetallic Imidazolate Polymer, the First Hydridized Cobalt (ii) Imidazolate," Z.Anorg. Allg. Chem., 2004, 630, pp. 1371-1373.

Yun-Qi Tian et al., "Determination of the Solvothermal Synthesis Mechanism of Metal Imidazolates by X-ray Single-Crystal Studies of a Photoluminescent Cadmium(II) Imidazolate and Its Imtermediate Involving Piperazine," Eur. J. Inorg. Chem., 2004, pp. 1039-1044.

Zhong-Lin Lu et al.; "Synthesis and crystal structure of an imidazolate-bridged dicopper tris(2-aminoethyl)amine complex"; Transition Met. Chem., 22, 1997, pp. 549-552.

Yun-Qi Tian et al.; "Two Polymorphs of Cobalt(II) Imidazolate Polymers Synthesized Solvothermally by Using One Organic Template N,N-Dimethylacetamide"; Inorg. Chem. 2004, 43, pp. 4631-4635.

Xiao-Chun Huang, Jie-Peng Zhang, Xiao-Ming Chen; "One-Dimensional Supramolecular Isomerism of Copper(I) and Silver(I) Imidazolates Based on theLigand Orientations," Crystal Growth & Design, 2006, vol. 6, No. 5, pp. 1194-1198.

Yunling Liu, Victor CH. Kravtsov, Randy Larsen, Mohamed Eddaoudi; "Molecular building blocks approach to the assembly of zeolite-like metal-organic frameworks (ZMOFs) with extra-large cavities"; Chem. Commun., 2006, pp. 1488-1490.

Philip L. Llewellyn et al.; "How Hydration Drastically Improves Adsorption Selectivity for $CO_2$ over CH4 in the Flexible Chromium Terephthlate MIL-53"; Angew. Chem. Int. Ed., 2006, 45, pp. 7751-7754.

Atsushi Kondo et al.; "Novel Expansion/Shrinkage Modulation of 2D Layered MOF Triggered by Clathrate Formation with $CO_2$ Molecules"; Nano Letters, 2006, vol. 6, No. 11, pp. 2581-2584.

Katharine Sanderson, "Space Invaders," news feature in Nature, vol. 448, Aug. 16, 2007, pp. 746-748.

* cited by examiner

Thermogravimetric Analyses of ZIF-7

Thermogravimetric Analyses of ZIF-9

Powder X-ray Diffraction Pattern of ZIF-1

Thermogravimetric Analyses of ZIF-1

Powder X-ray Diffraction Pattern of ZIF-11

Thermogravimetric Analyses of ZIF-11

Thermogravimetric Analyses of ZIF-8

Scanning Electron Microscopy Image of ZIF-7

ZIF-9 Adsorption Loading for Hydrogen and Various Hydrocarbons @ 301 K and 106.6 kPa Scanning Electron Microscopy Image of ZIF-1 (acetonitrile-exchanged)

Scanning Electron Microscopy Image of ZIF-1 (toluene-exchanged)

ZIF-1 (acetonitrile-exchanged) Isotherms for Various Hydrocarbons @ 301 K

Scanning Electron Microscopy Image of ZIF-11

Scanning Electron Microscopy Image of ZIF-8

SEPARATION OF HYDROGEN FROM HYDROCARBONS UTILIZING ZEOLITIC IMIDAZOLATE FRAMEWORK MATERIALS

CROSS-REFERENCE TO RELATED APPLICATIONS

This application claims the benefit of U.S. Provisional Application No. 61/066,550, filed Feb. 21, 2008.

FIELD OF THE INVENTION

The present invention relates to the selective separation of hydrogen from hydrocarbons in streams containing both hydrogen and hydrocarbons utilizing a zeolitic imidazolate framework material. Preferably, the stream to be separated is fed to the present process in a substantially gaseous phase. In preferred embodiments herein, the zeolitic imidazolate framework material is incorporated into a Swing Adsorption unit, more preferably a Pressure Swing Adsorption unit or a Temperature Swing Adsorption unit from which a hydrogen-rich stream is produced from a feedstream containing both hydrogen and hydrocarbon compounds.

BACKGROUND OF THE INVENTION

Gas separation is an important process utilized in various industries, particularly in the production of fuels, chemicals, petrochemicals and specialty products. A gas separation can be accomplished by a variety of methods that, assisted by heat, solids, or other means, generally exploits the differences in physical and/or chemical properties of the components to be separated. For example, gas separation can be achieved by partial liquefaction or by utilizing a solid adsorbent material that preferentially retains or adsorbs a more readily adsorbed component relative to a less readily adsorbed component of the gas mixture, or by several other gas separation techniques known in the industry. One such commercially practiced gas separation process is pressure swing adsorption ("PSA"). PSA processes, when operated under certain conditions, allow a selective component or components in a gas mixture to be preferentially adsorbed within the pore structure of porous adsorbent materials relative to a second component or components in the gas mixture. The total amount adsorbed of each component in the material (i.e., the adsorption capacity) and the selectivity of the adsorption for a specific component over another component may often be improved by operating the process under specific pressure and temperature conditions since both pressure and temperature influence the adsorption loading of the components to a different extent. The efficiency of the PSA process may be further improved by the implementation of processing steps, such as the use of purge stream(s) that have optimally chosen composition, pressures and temperatures. However, relatively few adsorbent materials have separation selectivities, adsorption capacities and other beneficial properties (such as chemical and physical inertness and durability) so as to be able to function as commercially viable and cost-efficient adsorbents in a PSA process.

Some adsorbent materials are able to adsorb a greater amount of one component than another component under certain conditions. Certain components may not be selectively adsorbed or may not be adsorbed to an acceptable level that would lead to an economically viable process. However, if sizable differences in adsorption properties exist for selective components in an adsorbent material, PSA processes can be used to effectively separate certain component gases from a mixture. For example, if a gas mixture such as air is passed at some pressure and temperature through a vessel containing an adsorbent material that selectively adsorbs more oxygen than nitrogen, at least a portion of the oxygen contained in the feedstream will stay in the adsorbent and the gas coming out of the vessel will be enriched in nitrogen. When the bed reaches a selected fraction of its total capacity to adsorb oxygen, it can be regenerated by various pressure swing techniques, thereby releasing the adsorbed oxygen (and any other associated gas components), which can then be captured and isolated as a separate product stream. The adsorbent material which has now been "desorbed" of the oxygen can then be reutilized and the various steps of the PSA process cycle are repeated so as to allow a continuous operation.

However, finding suitable materials that specifically discriminate between difficult to separate gases in both an efficient and effective manner (that is that they have both good separation selectivity and a high adsorption capacity) are not easily found. Additionally, many adsorbent materials known in the art do not hold up well to the additional components in the streams or are unable to sustain the severe pressure and/or temperature conditions, including cyclic conditions, required by the processes. Therefore, commercially suitable, and more importantly, commercially valuable adsorbent materials are not very readily available. Researchers in the industry continually look for improved adsorbent materials, process configurations and operating conditions to make these separation processes economically viable.

An early teaching of a PSA process having a multi-bed system is found in U.S. Pat. No. 3,430,418 wherein a system having at least four beds is described. This '418 patent describes a cyclic PSA processing sequence that includes in each bed: (1) higher pressure adsorption with release of product effluent from the product end of the bed; (2) co-current depressurization to intermediate pressure with release of void space gas from the product end thereof; (3) countercurrent depressurization to a lower pressure; (4) purge; and (5) repressurization. The void space gas released during the co-current depressurization step is commonly employed for pressure equalization purposes to provide purge gas to a bed at its lower desorption pressure. Another conventional PSA processes using three sorbent beds is disclosed in U.S. Pat. No. 3,738,087.

Another industrially important gas separation process is temperature swing adsorption ("TSA"). TSA processes, when operated under certain pressure and temperature conditions, allow some components to be selectively adsorbed over others within the pore structure of an adsorbent material. In this process, a stream containing components to be separated flows through an adsorbent material wherein one or more of the components are selectively adsorbed over another component or components. An effluent stream, reduced in concentration of the selectively adsorbed component(s) is obtained during this adsorption "stage" or "step" of the TSA process. In this process, after the adsorbent material has adsorbed a certain amount of the desired component(s), the temperature of the adsorbent is increased, and the selectively adsorbed component(s) is released, or desorbed from the adsorbent materials and can be collected separate from the effluent stream in this step of the overall TSA process cycle. By cyclically swinging the temperature of adsorbent beds, TSA processes can be used to separate components in a mixture when used with an adsorbent that selectively adsorbs one or more of the stream components in the feed mixture relative to one or more different stream components comprising the feed mixture.

PSA and TSA processes do not need to be mutually exclusive. A combined PSA/TSA process may be utilized, for example, by increasing the temperature of the adsorbent materials during the lower pressure purge step of a conventional PSA process to improve the desorption of the selectively adsorbed component(s) in the process. The bed temperature can then be reduced (or allowed to be reduced) during the adsorption portion of the PSA cycle to improve the adsorption characteristics and/or adsorption capacity of the material.

Besides using pressure and temperature to regenerate the adsorption bed, the adsorbent can be regenerated with a purge that is flowed through the adsorbent bed in a manner that displaces adsorbed molecules from the adsorbent. Processes that are conducted with this type of adsorbent regeneration technique are often called partial pressure purge displacement processes ("PPSA"). Processes such as PSA, TSA, purge displacement, and combination thereof are referred to herein as swing adsorption processes. These swing adsorption processes can be conducted with rapid cycles (i.e., cycles of short duration) in which case they are referred to as rapid cycle thermal swing adsorption (RCTSA), rapid cycle pressure swing adsorption (RCPSA), and rapid cycle partial pressure swing or displacement purge adsorption (RCPPSA) technologies.

Additionally, membrane separation processes can be used for the separation of gas components in a mixture. In a membrane separation process, one or more components of the mixed stream contact one side of a membrane material and a portion of the mixed stream permeates through the membrane and is retrieved from the other side of the membrane material as a "permeate" stream. In this process, the permeate stream has a higher concentration (in mole %, weight %, or volume % as defined by the process) of a select component than the mixed stream that initially contacts the membrane. A "retentate" stream is also obtained from the first side of the membrane which has a lower concentration (in mole %, weight %, or volume % as defined by the process) of a select component than the mixed stream that initially contacts the membrane. In this manner, a separation of components is made resulting in a higher value for the two separated streams (i.e., the retentate and the permeate streams) than the original mixed stream that is fed to the membrane separations process. The physical conditions on the permeate side of the membrane (for example pressure, temperature, and purge conditions) are chosen so that there is a gradient of chemical potential across the membrane that is favorable to drive the select component from the feed side to the permeate side of the membrane.

There is a need in the art for improved swing adsorption and/or membrane processes utilizing adsorbent materials for the selective separation of hydrocarbon components. In particular, there is a need in the art for improved swing adsorption and/or membrane processes utilizing adsorbent materials for the selective separation and removal of hydrogen from streams containing hydrogen and hydrocarbons. Preferably the streams are associated with a petroleum or petrochemical process and/or associated products.

United States Patent Publication No. US2007/0202038A1 discloses a family of materials which shall be referred to herein as zeolitic imidazolate frameworks (or "ZIF"s) materials. This publication describes in detail the synthesis and structural and pore volume characterization of various ZIF materials. It includes the low temperature physisorption characterization ($N_2$ and $H_2$ at 77K and Ar at 87K) of selected ZIF structures but it does not disclose adsorption properties of these materials at pressure and temperature conditions that would be relevant to separation processes of gases and hydrocarbons of interest in industrial applications.

SUMMARY OF THE INVENTION

The present invention is a separation process utilizing ZIF-containing materials to effectively separate hydrogen from hydrocarbons in process feedstreams comprised of both components. Preferably the process feedstream is associated with a petroleum or petrochemical process and/or associated products. As utilized herein, the term "hydrogen" (or equivalent term "$H_2$") is defined as molecular hydrogen with the chemical composition $H_2$. As utilized herein, the term "hydrocarbon(s)" (or "HC") is defined herein as any molecular compound containing at least one carbon atom and at least one hydrogen atom.

In accordance with one embodiment of the present invention there is provided a process for separating $H_2$ from a process feedstream, comprising:

a) contacting an adsorbent material comprised of a zeolitic imidazolate framework material with a process feedstream comprising $H_2$ and at least one hydrocarbon compound at a first pressure and first temperature;

b) adsorbing at least a portion of the hydrocarbon compound in the adsorbent material;

c) producing a $H_2$-rich product stream, wherein the $H_2$-rich product stream has a higher concentration of $H_2$ by mol % than the process feedstream; and d) producing a $H_2$-lean product stream at a second pressure and second temperature, wherein the $H_2$-lean product stream has a lower concentration of $H_2$ by mol % than the process feedstream;

wherein the zeolitic imidazolate framework material has a framework structure wherein each vertex of the framework structure is comprised of a single metal ion and each pair of connected adjacent vertices of the framework structure is linked by nitrogen atoms of an imidazolate anion or its derivative, and wherein the zeolitic imidazolate framework material has an adsorptive loading ratio for the hydrocarbon compound over $H_2$ of at least 5.

In a more preferred embodiment of the present invention the zeolitic imidazolate framework material is selected from ZIF-1, ZIF-7, ZIF-8, ZIF-9, and ZIF-11.

In another preferred embodiment, the $C_{2+}$ hydrocarbon compound is selected from $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane).

In accordance with one embodiment of the present invention there is provided a process for separating $H_2$ from a process feedstream, comprising:

a) contacting a first side of a membrane comprised of a zeolitic imidazolate framework material with a process feedstream comprising $H_2$ and at least one hydrocarbon compound at a first pressure and first temperature;

b) retrieving a first permeate stream from a second side of the membrane at a second pressure and second temperature, wherein the first permeate stream consists of components that selectively permeate through the membrane and the first permeate stream has a lower concentration of $H_2$ by mol % than the process feedstream; and c) retrieving a first retentate stream;

wherein the zeolitic imidazolate framework material has a framework structure wherein each vertex of the framework structure is comprised of a single metal ion and each pair of connected adjacent vertices of the framework structure is linked by nitrogen atoms of an imidazolate anion or its derivative, and wherein the zeolitic imidazolate framework material has an adsorptive loading ratio for the hydrocarbon compound over $H_2$ of at least 5.

DETAILED DESCRIPTION OF THE INVENTION

Figure 1:
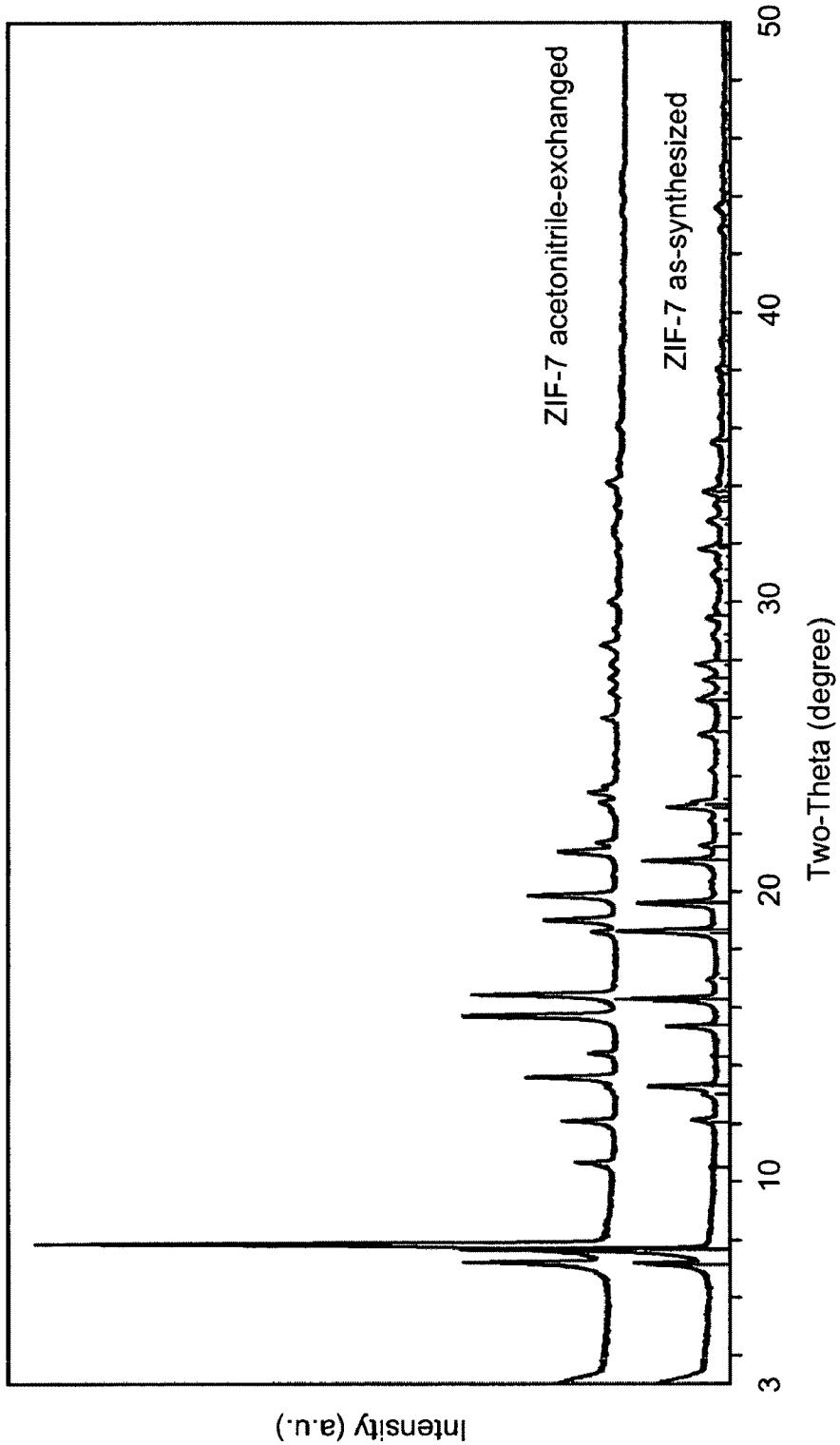
FIG. 1 is the experimental powder X-ray diffraction ("PXRD") patterns of the as-synthesized and acetonitrile-exchanged ZIF-7 samples of Example 1 herein. The calculated PXRD pattern (shown as the vertical stick patterns in the figure) for ZIF-7 based on the single crystal structure of ZIF-7 reported in the "Park Reference" as referenced herein is also shown in the figure.

The present invention is directed to processes for the separation of hydrogen from hydrocarbons in process feedstreams comprised of both components with a process utilizing adsorbents comprised of zeolitic imidazolate framework ("ZIF") materials. As utilized herein, the term "hydrogen" (or equivalent term "$H_2$") is defined as molecular hydrogen with the chemical composition $H_2$. As utilized herein, the term "hydrocarbon(s)" (or "HC") is defined herein as any molecular compound containing at least one carbon atom and at least one hydrogen atom.

Preferably the zeolitic imidazolate frameworks are utilized in a swing adsorption process. The general term "swing adsorption process" as used herein shall be taken to include Pressure Swing Adsorption ("PSA") processes, Temperature Swing Adsorption ("TSA") processes, Pressure Purge Displacement Processes ("PPSA"), Rapid Cycle Pressure Swing Adsorption ("RCPSA") processes, Rapid Cycle Temperature Swing Adsorption ("RCTSA") processes, Rapid Cycle Pressure Purge Displacement Processes ("RCPPSA") as well as combinations of these swing adsorption processes. In a preferred embodiment, the stream to be separated is fed to the process in a substantially gaseous state.

In other preferred embodiments of the present invention, zeolitic imidazolate framework ("ZIF") adsorbent materials are incorporated into a membrane material for the selective separation of hydrocarbons from hydrogen ("$H_2$") in streams containing both components. The ZIF materials will preferably be utilized in a matrixed membrane material to facilitate the separation of hydrocarbons from $H_2$. In a preferred embodiment, the feedstream to be separated will contact the membrane wherein the hydrocarbons and the $H_2$ in the feedstream will be substantially in a gaseous phase.

"Zeolitic imidazolate framework" (or "ZIF") materials are defined herein as microporous crystalline structures having framework topologies commonly found in zeolites and/or in other crystalline materials wherein each vertex of the framework structure is comprised of a single metal ion and each pair of connected adjacent vertices of the framework structure is linked by nitrogen atoms of an imidazolate anion or its derivative. The terms "micropore" or "microporous" as utilized herein is defined as a pore diameter or a material containing pore diameters of less than or equal to 2.0 nm (20 Å), respectively. Descriptions and the synthesis of some of the ZIF materials that can be utilized in the present invention are disclosed in United States Patent Publication No. US 2007/0202038A1 to Yaghi et al., which is hereby incorporated by reference.

The applicants of the present invention have discovered that ZIF materials can selectively separate hydrocarbons from $H_2$ in streams containing both of these components. Furthermore, this may be accomplished at conditions of pressure, temperature and compositions that are relevant to industrial processes. In order to separate two components from a mixture, the adsorption loading (e.g., in mmole/g) for the first component must be greater than the adsorption loading (e.g., in mmole/g) for the second component. Even though process schemes can be designed to operate at low ratios of adsorption loading (in mmole/g) for the first component vs. the adsorption loading (in mmole/g) for the second component, it is preferred that this "adsorptive loading ratio for at least one hydrocarbon component over $H_2$" of the ZIF material utilized be at least 5.

Since the required equipment size, cost and operating expenses tend to be significantly lowered at higher adsorptive loading ratios, the separations processes become much more attractive utilizing materials and conditions that lead to higher adsorptive loading ratios. In more preferred embodiments of the present invention, the ZIF material utilized in the present invention has an adsorptive loading ratio for at least one hydrocarbon component over $H_2$ of at least about 10, preferably at least about 15, and more preferably, at least about 20. In a most preferred embodiment, the ZIF material chosen is such that the specific hydrocarbon component to be separated from the hydrogen-containing stream is such that the adsorptive loading ratio for the specific hydrocarbon component over $H_2$ is at least 50, and in some applications can be at least 100. In a preferred embodiment of the present invention, the ZIF material utilized in the present invention is selected from ZIF-8, ZIF-11, ZIF-1, ZIF-7, and ZIF-9. In a more preferred embodiment of the present invention, the ZIF material utilized in the present invention is selected from ZIF-8, ZIF-11, and ZIF-1. In a more preferred embodiment of the present invention, the ZIF material utilized in the present invention is ZIF-8.

In preferred embodiments of the invention as described above, the hydrocarbon component is selected from methane ($CH_4$), ethylene ($C_2H_4$), ethane ($C_2H_6$), and propylene ($C_3H_6$). In a more preferred embodiment, the hydrocarbon component is ethylene ($C_2H_4$). In another more preferred embodiment, the hydrocarbon component is ethane ($C_2H_6$). In a most preferred embodiment, the hydrocarbon component is methane ($CH_4$).

As utilized herein, the term "carbon number" when utilized herein as referred to a hydrocarbon compound is defined as referring to the total number of carbon atoms in the hydrocarbon compound referenced. For example, a hydrocarbon compound referenced herein to have a carbon number of "3" means that the compound contains three carbon atoms. Similarly, as utilized herein the term "$C_x$" means that the compound referenced has X carbon atoms. For example a hydrocarbon contains three carbon atoms may be referred to herein as a "$C_3$ hydrocarbon". "Hydrocarbons" are compounds comprised of at least one carbon atom and at least one hydrogen atom.

The ratio described above is a property for a specific adsorbate-adsorbent pair, at given conditions of pressure and temperature. This ratio is referred to herein as the "adsorptive loading ratio". This ratio is defined herein as a unitless quantity that is equal to the adsorption loading (in mmole/g) for the first component divided by the adsorption loading (in mmole/g) for the second component for a specific adsorbent material at a specific pressure and temperature. As used herein, although it is preferred that the adsorption loading for each component on a particular ZIF material be measured under the operating component partial pressure and temperature conditions for the system, it is often more advantageous to measure the adsorption loading for a particular ZIF for each component material at more "standard" conditions of pressure and temperature. Therefore, for the purposes of this invention and the scope of the present invention, the adsorptive loading ratio for two components (e.g., $CH_4$ and $H_2$) can be measured at either operating partial pressure for the specific components and operating temperature conditions for the feedstream contacting the ZIF-containing adsorbent, or at single component testing conditions chosen herein to be 301 K (28° C.) and 106.6 kPa (800 torr). Unless stated otherwise, these latter conditions were used in the testing of the samples in the examples herein, which can be readily duplicated in a laboratory test facility.

ZIF materials that exhibit significantly large adsorptive loading ratios may be used in swing adsorption processes of the present invention to effectively and economically separate hydrocarbon components from $H_2$ in streams containing both components. Each of these swing adsorption processes are comprised of a number of "steps" that include a variety of adsorption and desorption steps that in combination lead to a complete swing adsorption "cycle" that is periodically repeated. Since multiple adsorbent beds are typically used, their appropriate time synchronization leads to the continuous production of products. A complete swing adsorption cycle on a particular adsorbent bed, therefore, comprises all of the adsorption and desorption steps that are taken, beginning with the very first contacting of the feed gas mixture with the adsorbate-free or substantially adsorbate-free adsorbent and continuing through the last desorption stage that regenerates the adsorbent into its adsorbate-free or substantially adsorbate-free state and further including any additional repressurizing and/or purging steps that may occur thereafter to bring the "cycle" back to the first contacting of the feed gas mixture with the adsorbate-free or substantially adsorbate-free adsorbent which has begun the "cycle". At this point, the next swing adsorption "cycle" is started and the cycle is subsequently repeated.

Typically, there is at least one adsorption step wherein a process feedstream is contacted with the adsorbent material in a swing adsorption process. The equivalent terms "process feedstream" or "inlet stream" as used herein in swing adsorption embodiments of the present invention is the mixed component stream comprising at least two components to be separated which is contacted with the adsorbent material during the adsorption cycle. During this step of the process, the process feedstream contacts the adsorbent material under certain process temperature and pressure conditions and as the process feedstream flows through the adsorbent material at least a portion of the "first component" (or "strongly adsorbed component") of the process feedstream is preferentially adsorbed by the adsorbent material with respect to a "second component" (or "weakly adsorbed component"). During this step an "effluent stream" (or "$H_2$-rich product stream" herein) is drawn from the swing adsorption process wherein the total number of moles of the first component into the swing adsorption process is higher than the total number of moles of the first component out of the swing adsorption process during this adsorption step. Although it is not necessary, it is preferred that the molar concentration of the first component in the process feedstream be greater than the molar concentration of the first component in the effluent stream.

The swing adsorption process is also comprised of at least one desorption step wherein at least a portion of the first component that has been preferentially adsorbed by the adsorbent material is recovered in what is termed herein as a "desorbed stream" (or "$H_2$-lean product stream" herein). During this step, the process conditions in the swing adsorption process are changed to allow at least a portion of the first component to be desorbed from the adsorbent material and collected as a "desorbed stream". This desorption can be induced by a pressure swing, a temperature swing, the introduction of a partial pressure purge displacement stream, or a combination thereof. In a preferred embodiment, the molar concentration of the first component in the desorbed stream is greater than the molar concentration of the first component in the process feedstream. In another preferred embodiment, the molar concentration of the first component in the desorbed stream is greater than the molar concentration of the first component in the effluent stream.

Although at least these two steps (i.e., adsorption and desorption) are required in the swing adsorption processes of the current invention, additional steps may be utilized in the swing adsorption processes. These steps include, but are not limited to, concurrent purge steps, counter-current purge steps, and/or multiple partial pressurization or depressurization steps. These additional steps may be utilized to improve first and/or second component recovery, improve first or second component purity, and/or obtain multiple product streams in addition to the effluent stream and desorbed stream described above.

One embodiment of the swing adsorption process of the present invention utilizes a Pressure Swing Adsorption ("PSA") process wherein the adsorbent material is comprised of a ZIF material and the "first component" as described above is a hydrocarbon compound (e.g., methane, ethylene, ethane, or propylene) and the "second component" as described above is hydrogen, $H_2$. In this PSA process, the partial pressure of the first component during the adsorption step is higher than the partial pressure of the first component during the desorption step which allows at least a portion of the adsorbed first component to be recovered in the desorption step and the adsorbent material to be regenerated by depletion of the adsorbed components for reuse in a subsequent adsorption step. This is accomplished in part by exposing the adsorbent material to lower partial pressure conditions in the desorption step than the partial pressure conditions in the adsorption step. This desorption can be further assisted by utilizing a purge gas to lower the partial pressure of the first component during the desorption step, a purge step, a partial pressurization step, or a partial depressurization step as described above. It should also be noted that the swing adsorption process described herein may include PSA, TSA, PPSA, RCPSA, RCTSA, RCPSA processes or combinations therein wherein the pressure is lowered to below atmospheric pressure (i.e., to a vacuum pressure) during at least one of a desorption step, a purge step, a partial pressurization step, or a partial depressurization step in the swing adsorption process cycle.

Figure 27:
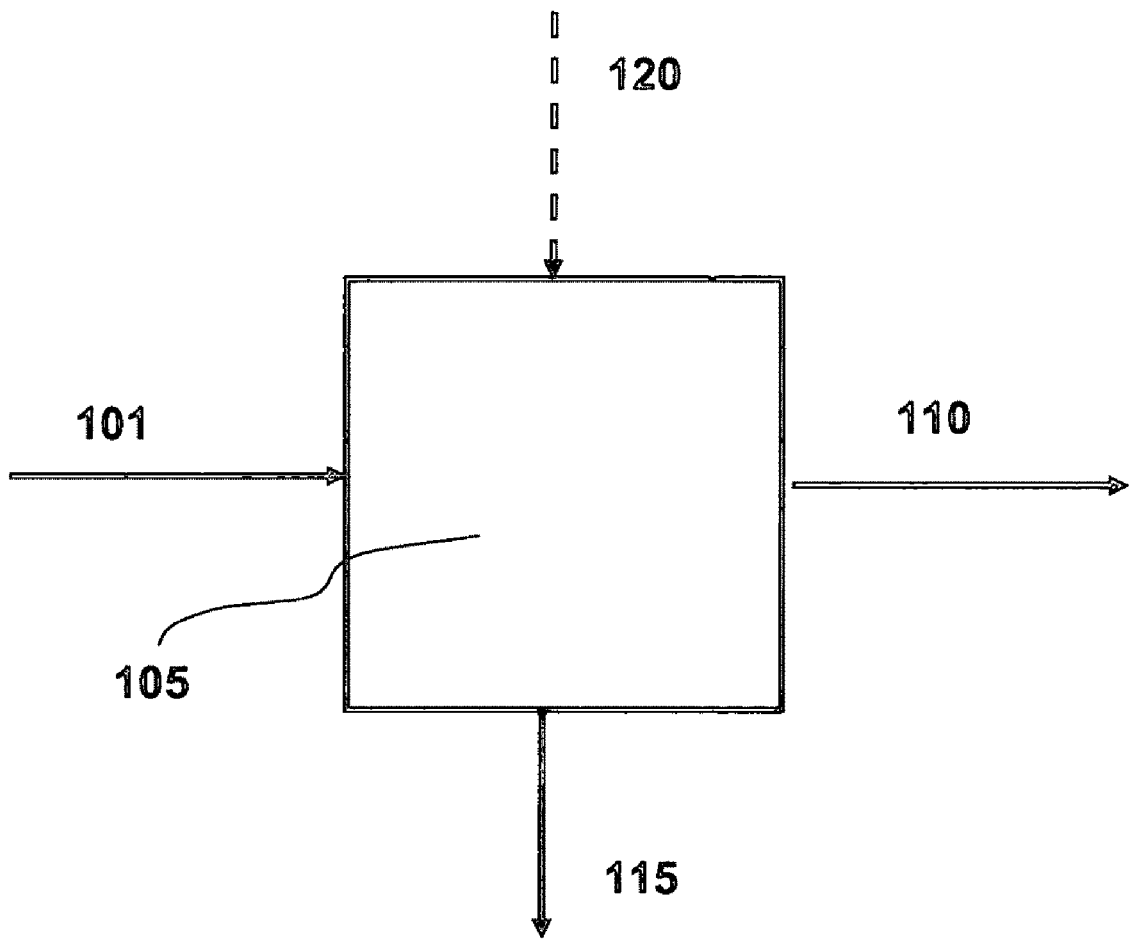
FIG. 27 is a simplified diagram showing a process embodiment of the current invention which utilizes a swing adsorption process with a ZIF-containing adsorbent material for the selective separation of a hydrocarbon component from hydrogen ($H_2$).

FIG. 27 shows a schematic of a preferred embodiment of the present invention wherein a process feedstream (101) comprising hydrogen ($H_2$) and at least one hydrocarbon component (i.e., "hydrocarbon compound") is fed to a process of the present invention wherein a Pressure Swing Adsorption ("PSA") unit (105) is utilized wherein the PSA unit is comprised of an adsorbent material wherein the adsorbent material is comprised of a ZIF material that has an adsorptive loading ratio for the hydrocarbon component over $H_2$ of greater than 5. Here, the hydrocarbon component is preferentially adsorbed by the ZIF material in the PSA unit with respect to $H_2$. During at least one stage in the PSA unit cycle, a $H_2$-rich stream (110) is drawn from the PSA unit (105) wherein the $H_2$-rich stream (110) has a higher content of $H_2$ by mol % than the process feedstream (101). Additionally, during at least one other stage in the PSA unit cycle, a $H_2$-lean stream (115) is drawn from the PSA unit (105) wherein the $H_2$-lean stream (115) has a lower content of $H_2$ by mol % than the process feedstream (101). In a preferred embodiment, the $H_2$-lean stream (115) also has a higher content of the hydrocarbon component by mol % than the process feedstream (101).

It should also be noted that a purge stream (120) may optionally be fed to the PSA unit during at least one desorption stage of the overall PSA cycle to assist in removing the adsorbed process feedstream components from the adsorbent material. Although purge stream (120) is shown in FIG. 27 to be co-current with the flow of the desorbed $H_2$-lean stream (115), it is known to those of skill in the art that the flow arrows as drawn in FIG. 27 are not meant to show directional flow within the PSA unit, but that the flow directions of the various streams may be designed as co-current, counter-current, cross-current, or otherwise in order to maximize the functionality of the process.

As described prior, by operating the PSA unit with multiple alternating beds/stages in the cycle, a process with a "near continuous" flow can be achieved. This simulated continuous flow can also be achieved by utilizing a multitude of staged PSA units (e.g., multiple parallel PSA units) or a combination of multiple PSA units each with multiple alternating beds/stages. This is true for all process embodiments as described herein and is within the skills of one of skill in the art to design with the information as disclosed herein.

In the PSA processes described herein, it is desired to capture a significant percentage (or "recovery") of the $H_2$ in the feedstream in the $H_2$-rich stream from the PSA unit. In preferred embodiments of the present invention, the $H_2$-rich stream contains at least 70 mol % of the $H_2$ present in the feedstream to the PSA process. More preferably, the $H_2$-rich stream contains at least 80 mol % of the $H_2$ present in the feedstream to the PSA process, and even more preferably, the $H_2$-rich stream contains at least 85 mol % of the $H_2$ present in the feedstream to the PSA process. These embodiments ensure a high level of hydrogen recovery in the $H_2$-rich stream product stream from the present invention.

Alternatively, in the PSA processes described herein, it may be desired to produce a $H_2$-rich stream from the PSA unit with a high hydrogen purity (i.e., with minimal non-hydrogen contaminants). In preferred embodiments of the present invention, the $H_2$-rich stream contains less than 30 mol % of the hydrocarbon compounds present in the feedstream to the PSA process. More preferably, the $H_2$-rich stream contains less than 20 mol % of the hydrocarbon compounds present in the feedstream to the PSA process, and even more preferably, the $H_2$-rich stream contains less than 15 mol % of the hydrocarbon compounds present in the feedstream to the PSA process. These embodiments ensure a high level of hydrogen purity in the $H_2$-rich stream product stream from the present invention.

Another type of swing adsorption process of the present invention is a Temperature Swing Adsorption ("TSA") process wherein the adsorbent material is comprised of a ZIF material and the "first component" as described above is a hydrocarbon, "HC", compound (e.g., methane, ethylene, ethane, or propylene) and the "second component" as described above is hydrogen, $H_2$. The TSA processes operate similar to the PSA processes above wherein the partial pressure of the first component during the adsorption step is higher than the partial pressure of the first component during the desorption step which allows at least a portion of the adsorbed first component to be recovered in the desorption step and the adsorbent material to be regenerated by depletion of the adsorbed components for reuse in a subsequent adsorption step. However, in the TSA processes, this is accomplished in part by exposing the adsorbent material to higher temperature conditions in the desorption step than the temperature conditions in the adsorption step. This desorption can be further assisted by utilizing a purge gas to lower the partial pressure of the first component and/or provide heating of the adsorbent material during the desorption step, a purge step, a partial pressurization step, or a partial depressurization step as described above.

An embodiment of the basic TSA process of the present invention is also illustrated by FIG. 27, except that the basic difference is that instead of raising the partial pressures of the stream/adsorbed components during to the adsorption step(s) and lowering the partial pressures of the stream/adsorbed during to the desorption step(s) via a change in pressure, these component partial pressures are raised and lowered, respectively, by lowering and raising the temperature of the components in contact with the adsorptive media.

It should also be noted that the steps of the PSA and TSA processes can also be combined in a PSA/TSA process of the present invention. In these combined processes, both pressure and temperature changes or "swings" are made between the adsorption steps and desorption steps of the process, resulting in a desired separation of at least a portion of the first component from the second component of the mixed component process feedstream fed to the inlet of the PSA/TSA process.

In embodiments of the swing adsorption processes of the present invention, the ZIF materials may be incorporated into the adsorption swing process in many structural forms and/or in combination with additional components. The ZIF materials may be incorporated as crystallites of preferred size and shape of substantially uniform dimensions or with dimensions suitably distributed according to a preferred distribution. The crystallites may be used directly as produced in the synthesis steps or be more preferably formulated into larger aggregates or incorporated into a structured or matrix material to provide form, stability, and/or in combination with other complementary co-adsorbent materials that can fulfill a variety of other beneficial functions to the overall process. Non-limiting examples include incorporating the ZIF material with a binder material to form a matrix comprising a binder material selected from a crystalline polymer, a non-crystalline polymer, an epoxy, a thermoplastic, a clay, a silica-containing material, an alumina-containing material, and a titania-containing material. The binder material may also exhibit either a microporous or a mesoporous structure. Additionally, it may be advantageous to add suitably chosen additives into this binder material. These additives can be used to improve the adsorption/desorption and transport properties of the selected components within the ZIF materials. Non-limiting examples of these additional additives include zeolites and microporous crystalline materials such as pure silicates, silicoaluminophosphates ("SAPO"s), aluminophosphates ("AlPO"s). In a preferred embodiment, the additional additive is a zeolite. Other additives such as metals or other high heat capacity and high heat conductivity materials may also be incorporated into the matrix to assist in the capture and transfer of at least a portion of the heat that is generated during the exothermic adsorption step(s) of the swing adsorption process, thereby shortening the duration of the cycling process, increasing throughput, and further improving the overall efficiency of the ZIF material for adsorbing the select component or components.

When the ZIF materials are incorporated with a binder, the adsorbent material can be formulated into optimal geometric shapes or be applied onto supporting substrates which further improve the durability of the adsorbent and the rate at which the selected adsorbing components are brought into contact with the adsorption sites of the ZIF material. Non-limiting examples include beads, extrudates, formed pellets, structured beds, monoliths and hollow fibers, as well as coatings applied to plates or monolithic structures fibers or hollow fibers. Depending upon the specific situation, inlet stream composition as well as product stream compositions, process conditions and equipment design for the process of the present invention, certain structures and/or matrix compositions can provide improved separation efficiencies and/or selectivities for the overall process.

Any of the steps described above (i.e., structuring, additives, co-adsorbents, etc) that allow a reduction in the duration of a complete swing adsorption cycle or simply "cycle" are of utmost practical importance since shorter cycle times result in higher throughputs and/or can reduce equipment cost. Whereas conventional swing adsorption processes typically operate at cycles with durations of the order of minutes, with the materials of the present invention and the abovementioned process modifications, it is possible to significantly reduce the duration of a complete cycle by more than 50% over conventional swing adsorption processes. These rapid cycle swing adsorption processes that are enabled by the materials and process conditions of the present invention are particularly advantageous from an economic standpoint. In preferred embodiments of the present invention, the ZIF material is utilized in a swing adsorption process wherein the cycle time is less than about 1 minute, and more preferably, the ZIF material is utilized in a swing adsorption process wherein the cycle time is less than about 30 seconds. In an even more preferred embodiment of the present invention, these short cycle times are incorporated into a rapid cycle pressure swing adsorption ("RCPSA") process embodiment of the present invention.

In another embodiment of the present invention, the ZIF material can be incorporated into a membrane separations process for the selective separation of a hydrocarbon compound (e.g., methane, ethylene, ethane, or propylene) from hydrogen, $H_2$, in streams comprising a mixture of these components. In this embodiment, a ZIF material is incorporated within or coated onto an inorganic substrate or a polymer material and utilized in a membrane separation process, thereby producing a "ZIF-containing membrane". The ZIF material of the membrane has a net permeation affinity for a specific hydrocarbon compound (or compounds) over hydrogen, $H_2$. The permeation rate can be typically described in terms of two multiplicative factors, one related to the diffusion rate and another related to the adsorption loadings of the components of the mixture on the ZIF material. With respect to this latter factor, a ZIF material incorporated into the membrane which has a higher adsorptive loading ratio for a hydrocarbon compound over $H_2$, improves the concentration gradient for the hydrocarbon compound either at the membrane surface (if coated onto the membrane surface) and/or in the membrane (if incorporated into the membrane matrix). This improved concentration gradient enhances the selective permeation of the hydrocarbon compound relative to $H_2$ through the membrane, resulting in an improved recovery of $H_2$ in the membrane process retentate stream.

In this embodiment of the present invention, a process feedstream comprising a hydrocarbon compound and hydrogen, $H_2$, contacts a first side of a ZIF-containing membrane and at least a portion of the process feedstream permeates through the membrane and is retrieved from a second side of the membrane material as a permeate stream. The permeate stream (or "$H_2$-lean product stream" herein) is obtained from the second side of the membrane and the permeate stream thus obtained has a lower mol % of $H_2$ than the process feedstream. The equivalent terms "process feedstream", "feedstream", or "inlet stream" as used herein in membrane process embodiments of the present invention is the mixed component stream comprising at least two components to be separated which is contacted with the first side of the ZIF-containing membrane. It should be noted that in some embodiments, a "sweep stream" may be utilized on the permeate side of the ZIF-containing membrane in the membrane separation process of the present invention. It should also be noted that the term "permeate stream" as used herein and its composition properties are measured based solely upon the composition of the stream that permeates through the ZIF-containing membrane. For purposes of this invention, if any additional stream, such as a sweep stream, is added on the permeate side of the membrane process, the composition of this sweep stream must be excluded from the compositional analysis of the permeate stream.

Continuing with this process embodiment of the present invention, at least one retentate stream (or "$H_2$-rich product stream" herein) is also obtained from the first side of the membrane which has a higher mol % of $H_2$ than the process feedstream that initially contacts the membrane. In this manner, a separation of components is made resulting in a higher value for the two separated streams (i.e., the retentate and the permeate streams) than the original mixed stream that is fed to the membrane separations process.

Figure 28:
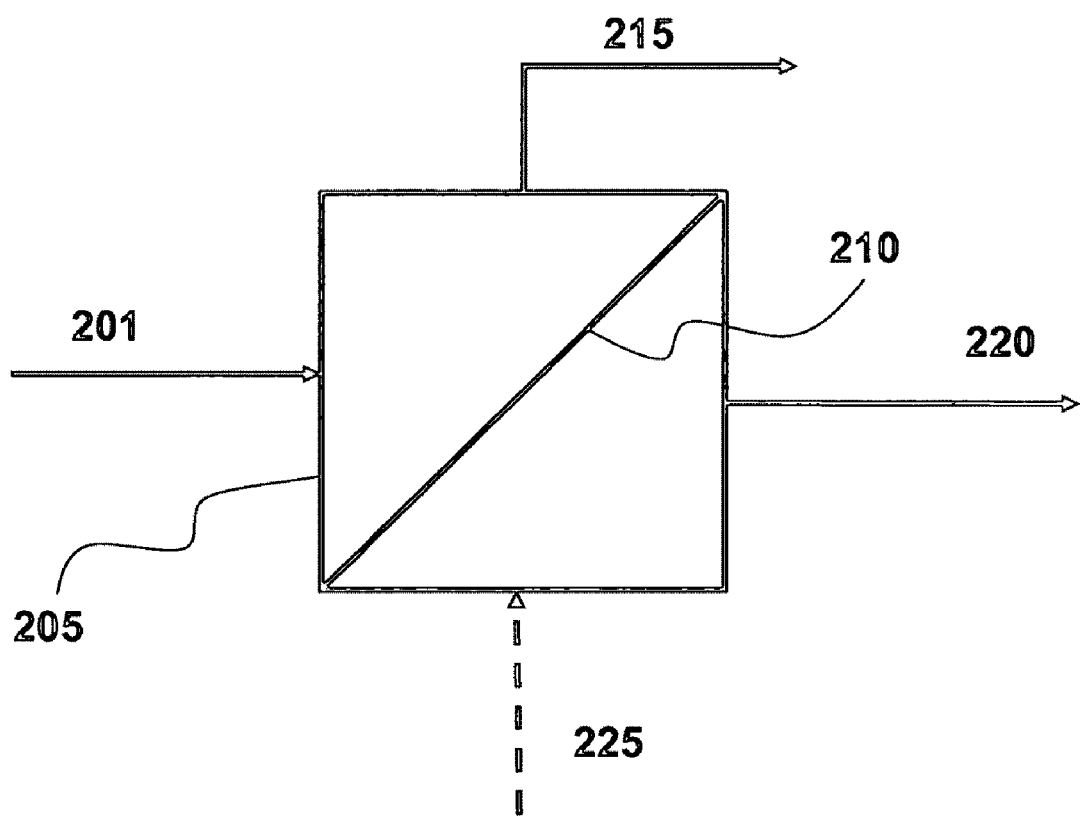
FIG. 28 is a simplified diagram showing a process embodiment of the current invention which utilizes a membrane separations process with a ZIF-containing selective membrane for the selective separation of a hydrocarbon component from hydrogen ($H_2$).

FIG. 28 illustrates this concept in a schematic of a preferred embodiment of the present invention wherein a process feedstream (201) comprising $H_2$ and at least one hydrocarbon component (or "hydrocarbon compound") is fed to a process of the present invention wherein a membrane separations unit (205) is utilized wherein the membrane separations unit contains a selective membrane material (210) which is comprised of a ZIF material that has an adsorptive loading ratio for the at least one hydrocarbon component over $H_2$ of at least 5. Here, the hydrocarbon component is preferentially adsorbed by the ZIF material in the selective membrane with respect to $H_2$. Here, a $H_2$-rich stream (215) is continuously drawn as a "retentate" from the membrane separations unit (205) wherein the $H_2$-rich stream (215) has a higher content of $H_2$ by mol % than the process feedstream (201). A $H_2$-lean stream (220) that is comprised of selective components that permeate through the ZIF-containing membrane is continuously drawn as a "permeate" from the membrane separations unit (205) wherein the $H_2$-lean stream (220) has a lower content of $H_2$ by mol % than the process feedstream (201). In a preferred embodiment, the $H_2$-lean stream (220) also has a higher content of the hydrocarbon component by mol % than the process feedstream (201).

It should also be noted that a sweep stream (225) may optionally be fed to the membrane separations unit during the process to assist in removing the $H_2$-lean stream components that have permeated from the selective membrane from the permeate (or "back") side of the selective membrane. This may be utilized to improve the concentration gradient of the selectively permeated materials across the membrane thus improving the overall process benefits. In a preferred embodiment, a sweep stream is utilized which can be easily separated from the $H_2$-lean stream components of the process and be recycled for reuse as a sweep stream.

In preferred embodiments, the ZIF material utilized in the membrane process of the present invention has an adsorptive loading ratio for a at least one hydrocarbon component over $H_2$ of at least about 5; more preferably, the adsorptive loading ratio is at least about 10, and even more preferably, at least about 20. In a preferred embodiment of the present invention, the ZIF material utilized in the present invention is selected from ZIF-8, ZIF-11, ZIF-1, ZIF-7, and ZIF-9. In a more preferred embodiment of the present invention, the ZIF material utilized in the present invention is selected from ZIF-8, ZIF-11, and ZIF-1. In a more preferred embodiment of the present invention, the ZIF material utilized in the present invention is ZIF-8.

In more preferred embodiments, as described above, the hydrocarbon component in the process feedstream to the membrane separation process is selected from methane ($CH_4$), ethylene ($C_2H_4$), ethane ($C_2H_6$), and propylene ($C_3H_6$). In an even more preferred embodiment, the hydrocarbon component is ethylene ($C_2H_4$). In another even more preferred embodiment, the hydrocarbon component is ethane ($C_2H_6$). In a most preferred embodiment, the hydrocarbon component is methane ($CH_4$).

The membranes utilized in embodiments of the present invention can be asymmetric and can be comprised of several layers of different materials. To improve the mass transfer characteristics of these asymmetric membrane structures one or more of these layers can be a porous material. A thin selective layer imparts most of the molecular selectivity in the asymmetric membrane structure and in a preferred embodiment this selective layer contains the ZIF material. On the feed side molecules are selectively adsorbed in the selective layer and on the permeate side the molecules are desorbed. The selective ZIF-containing layer can optionally include other materials. One of the materials that can be present in the ZIF-containing layer is a polymer. When the ZIF containing layer contains more than 10 vol % of another material the selective layer is called a mixed matrix. To mitigate the effect of any defects or pinholes in the selective layer, a reparation coating or reparation layer can be incorporated in the membrane structure.

The ZIF-containing membrane will typically be part of a membrane module that includes a pressure housing. Non-limiting examples of ZIF-containing membrane structures that can be incorporated into the membrane module are hollow-fiber membrane structures, flat sheet membrane structures, and monolithic membrane structures. The membrane module will typically contain seals to isolate the retentate and permeate zones of the module and to prevent flow bypass or cross-contamination of the retentate stream(s) to the permeate stream(s). The seals may also serve as a device for holding the membrane in place within the membrane module.

There are many applications in the industry which can benefit from the process of the present invention which enables such an efficient separation of hydrogen, $H_2$, from hydrocarbons, preferably, but not limited to, in a gas phase stream.

One such general application is the purification of a supplied or generated hydrogen gas stream. In the petroleum refining and petrochemical industries, management of hydrogen gas streams is one of the most important and integrated activities in the overall process for refinement of petroleum fuels and production of petrochemical products and intermediates. Many of these specific processes rely on very significant volumes of hydrogen for functionality. In most cases, the hydrogen stream must be at a significant to very high hydrogen purity (typically from about 80 to 99+ mol % hydrogen) in order for the process to operate properly or to at least operate efficiently. As such, while some hydrogen is produced as a byproduct in petroleum and petrochemical processes for use, frequently, additional hydrogen must be synthesized or else supplied from an outside source to the petroleum and petrochemical refinery processes. In either case, frequently at least a portion of this hydrogen-containing stream is comprised of contaminants, including hydrocarbons, and the stream must be purified, or is beneficially purified, for further use in petroleum and petrochemical refinery processes that require high purity hydrogen.

One such process common in the industry for producing hydrogen is via a steam reforming process which involves the conversion of methane (and other hydrocarbons in natural gas) into hydrogen and carbon monoxide by reaction with steam over a suitable catalyst, preferably a nickel-based catalyst. However, it should be noted that although the actual process produces a high-content hydrogen product stream, this product stream contains "contaminant compounds" including, but not limited to methane and higher carbon weight hydrocarbon compounds which need to be removed in order to improve the hydrogen purity of the stream. Steam reforming generally involves the following steps, as illustrated for methane conversion:

a. Reforming involves methane reacting with steam at elevated temperatures, preferably from about 850° C. to about 900° C. (1560° F.-1740° F.) to produce a synthesis gas (syngas), a mixture primarily made up of hydrogen and carbon monoxide;

$$CH_4 + H_2O \rightarrow CO + 3H_2$$

b. Shift Reaction, typically referred to as a water gas shift (WGS) reaction wherein the carbon monoxide that is produced in the first reaction is reacted with steam over a catalyst to form hydrogen and carbon dioxide. This step is usually conducted in two stages consisting of a high temperature shift and a low temperature shift. The high temperature shift is typically performed at about 350° C. (662° F.) and the low temperature shift at about 190° C. to 210° C. (374° F.-410° F.).

$$CO + H_2O \rightarrow CO_2 + H_2$$

c. Hydrogen produced from steam methane reforming typically includes small quantities of carbon monoxide, carbon dioxide, and hydrogen sulfide as impurities and, depending on its intended use, may require further purification. The primary steps for purification is methanation which comprises an exothermic, fixed-bed catalytic reactions of CO and $CO_2$ with hydrogen at temperatures of about 700° F. to about 800° F. over a nickel on alumina catalyst.

$$CO + 3H_2 \rightarrow CH_4 + H_2O$$

$$CO_2 + 4H_2 \rightarrow CH_4 + 2H_2O$$

The swing adsorption and membrane separation processes of the present invention can be utilized to improve the hydrogen purity of a hydrogen-containing gas stream produced by a steam reforming process. In a swing adsorption process of the present invention, a hydrogen-containing feedstream produced by a steam reforming process is sent to a swing adsorption unit of the present invention comprising a zeolitic imidazolate framework ("ZIF") material wherein the stream is separated into at least a $H_2$-rich effluent stream and a $H_2$-lean desorbed stream. Here, the $H_2$-rich effluent stream has a mol % concentration of hydrogen greater than the hydrogen-containing feedstream. The $H_2$-rich effluent stream produced by the current process can then be further utilized as an improved gas feedstream to hydroprocessing or chemical processing units within a petroleum or petrochemical refinery.

As discussed, these hydrogen-containing gas streams are often produced by a central manufacturer via a variety of processes and the hydrogen-containing gas streams are purchased by petroleum and petrochemical refineries. Therefore, in a similar preferred embodiment, a swing adsorption process of the present invention is utilized in a similar manner to produce a $H_2$-rich effluent stream from at least a portion of a purchased hydrogen-containing gas stream.

In a preferred embodiment of the present invention, the process feedstream (101) as exemplified by the swing processes (PSA or TSA) of FIG. 27 is comprised of hydrogen from a steam reforming process and hydrocarbons wherein the $H_2$ in the process feedstream is selectively separated from the hydrocarbon components in the process feedstream. In another preferred embodiment of the present invention, the process feedstream (101) as exemplified by the membrane separations process of FIG. 28 is comprised of hydrogen from a steam reforming process and hydrocarbons wherein the $H_2$ in the process feedstream is selectively separated from the hydrocarbon components in the process feedstream. In additional preferred embodiments of the present invention, the $H_2$-rich stream (110) contains at least 70 mol % of the $H_2$ present in the process feedstream. More preferably, the $H_2$-rich stream (110) contains at least 80 mol % of the $H_2$ present in the process feedstream, and even more preferably, the $H_2$-rich stream (110) contains at least 85 mol % of the $H_2$ present in the process feedstream.

Additionally, hydrogen can be produced internal to a petroleum refinery via a catalytic reforming process. In the catalytic reforming process, hydrocarbons preferably in the distillate to naphtha fuel ranges are contacted with a reforming catalyst at elevated temperatures in the presence of hydrogen. These processes typically can either be of either the fixed bed or the continuous bed varieties. The catalytic reforming processes typically use a platinum-containing catalyst which is utilized to improve the octane of the hydrocarbon feedstreams via de-hydrogenation reactions. These catalytic reforming processes are known to those of skill on the art.

While the catalytic reforming process is a net producer of hydrogen, the purity of the hydrogen produced is typically considerably lower than preferred for optimum operation. A portion of the hydrogen-containing stream produced by the catalytic reforming process is recycled back to the catalytic reforming process under pressure. The object of returning some of the net produced hydrogen for the process is to aid in process kinetics as well as prevent excessive coking of the platinum reforming catalysts. The higher the purity of the recycled hydrogen-containing stream, the lower the total volume of the required hydrogen-containing recycle stream in the process. This results in significant energy savings as well as allows higher production rates from a given set of refinery equipment. In a preferred embodiment, a swing adsorption or membrane separation process of the present invention is utilized in the hydrogen-containing recycle stream of a catalytic reforming process wherein an $H_2$-rich effluent stream is produced and at least a portion of the $H_2$-rich effluent stream is recycled back to the catalytic reforming process. In another embodiment, at least a portion of the $H_2$-rich effluent stream produced by the processes of the present invention is exported from the catalytic reforming process as a net produced hydrogen-containing stream.

In a preferred embodiment of the present invention, the process feedstream (101) as exemplified by the swing processes (PSA or TSA) of FIG. 27 is comprised of hydrogen from a catalytic reforming process and hydrocarbons wherein the $H_2$ in the process feedstream is selectively separated from the hydrocarbon components in the process feedstream. In another preferred embodiment of the present invention, the process feedstream (101) as exemplified by the membrane separations process of FIG. 28 is comprised of hydrogen from a catalytic reforming process and hydrocarbons wherein the $H_2$ in the process feedstream is selectively separated from the hydrocarbon components in the process feedstream and at least a portion of the $H_2$-rich stream (110) is recycled back to the catalytic reforming process. In additional preferred embodiments of the present invention, the $H_2$-rich stream (110) contains at least 70 mol % of the $H_2$ present in the process feedstream. More preferably, the $H_2$-rich stream (110) contains at least 80 mol % of the $H_2$ present in the process feedstream, and even more preferably, the $H_2$-rich stream (110) contains at least 85 mol % of the $H_2$ present in the process feedstream.

Embodiments of the present invention may also be preferably utilized to purify hydrogen-containing feedstreams to various hydrogen-consuming hydroprocessing units utilized in the refinery. As used herein, the term "hydroprocessing" is defined as any petroleum refining process that is a net consumer of hydrogen, wherein a catalyst is contacted with a hydrocarbon-containing feedstream in the presence of hydrogen thereby resulting in a hydrocarbon-containing product stream that has a compositional molecular hydrocarbon compound distribution different from the hydrocarbon-containing feedstream. Such hydroprocessing units include, but are not limited to, hydrodesulfurization, hydrocracking, hydroisomerization, and hydrogenation units. These general refining processes are well known to those of skill in the art.

In these processes, a hydrocarbon-containing stream is fed to the hydroprocessing unit where it contacts a hydroprocessing catalyst in a hydroprocessing reactor in the presence of a hydrogen-containing feedstream. A hydroprocessing unit product stream is removed from the process and separated into a hydrotreated product stream and a hydrogen-containing product stream. Preferably, at least a portion of the hydrogen-containing product stream is recycled back to the hydroprocessing unit (or more correctly, back to the hydroprocessing reactor). However, this recycled hydrogen-containing product stream possesses a hydrogen concentration typically below optimum for the hydroprocessing unit. The hydrogen-containing product stream contains hydrocarbons that undesirably contaminate and dilute the hydrogen purity of the hydrogen-containing product stream.

In a preferred embodiment, swing adsorption process of the present invention is utilized to increase the hydrogen concentration of at least a portion of the hydrogen-containing product stream prior to recycling the hydrogen-containing product stream back to the hydroprocessing unit or reactor. Here, at least a portion of the hydrogen-containing product stream for a hydroprocessing unit is sent to a swing adsorption unit of the present invention comprising a zeolitic imidazolate framework ("ZIF") material wherein the stream is separated into at least a $H_2$-rich effluent stream and a $H_2$-lean desorbed stream. Here, the $H_2$-rich effluent stream has a mol % concentration of hydrogen greater than the hydrogen-containing product feedstream to the swing adsorption process. At least a portion of this $H_2$-rich effluent stream is further returned (or "recycled") to the hydroprocessing reactor thereby resulting in improved performance of the hydroprocessing unit. This improved performance can be manifested in an improved hydroprocessed product benefit, higher hydroprocessing unit throughput, lower energy costs, and/or lower equipment costs depending upon the design of the unit and how the present invention is incorporated into the overall unit operation. With knowledge of the present invention, the manner in which to implement the present invention in order to obtain the particular benefits described are well known to those of skill in the art.

It should also be stated that although the hydrogen purity in a hydroprocessing unit can also be improved by improving the hydrogen purity in the hydrogen-containing product stream utilized as a recycle gas, similarly, the hydrogen purity in a hydroprocessing unit can also be improved by improving the hydrogen purity in the hydrogen-containing feedstream. In this embodiment, at least a portion of the hydrogen-containing feedstream for a hydroprocessing unit is sent to a swing adsorption unit of the present invention comprising a zeolitic imidazolate framework ("ZIF") material wherein the stream is separated into at least a $H_2$-rich effluent stream and a $H_2$-lean desorbed stream. Here, the $H_2$-rich effluent stream has a mol % concentration of hydrogen greater than the hydrogen-containing product feedstream to the swing adsorption process. At least a portion of this $H_2$-rich effluent stream is then sent to the hydroprocessing unit (or more correctly, to the hydroprocessing reactor) resulting in improved benefits similar to those described above for treating the hydrogen-containing product stream, whereby a portion of the $H_2$-rich effluent stream which is then recycled back to the hydroprocessing reactor.

In a preferred embodiment of the present invention, the process feedstream (101) as exemplified by the swing processes (PSA or TSA) of FIG. 27 is comprised of hydrogen from a hydroprocessing reactor and hydrocarbons wherein the $H_2$ in the process feedstream is selectively separated from the hydrocarbon components in the process feedstream. In another preferred embodiment of the present invention, the process feedstream (101) as exemplified by the membrane separations process of FIG. 28 is comprised of hydrogen from a hydroprocessing reactor and hydrocarbons wherein the $H_2$ in the process feedstream is selectively separated from the hydrocarbon components in the process feedstream and at least a portion of the $H_2$-rich stream (110) is recycled back to the hydroprocessing reactor. In additional preferred embodiments of the present invention, the $H_2$-rich stream (110) contains at least 70 mol % of the $H_2$ present in the process feedstream. More preferably, the $H_2$-rich stream (110) contains at least 80 mol % of the $H_2$ present in the process feedstream, and even more preferably, the $H_2$-rich stream (110) contains at least 85 mol % of the $H_2$ present in the process feedstream.

In another preferred embodiment, swing adsorption process of the present invention is utilized to recover a hydrogen enriched stream from a fuel gas stream. Fuel gas is comprised of light gases (predominantly hydrogen, $C_1$ through $C_5$ hydrocarbons, and other contaminant compounds) that are produced by refinery processes. These light gases are generally captured and stored at fairly low pressures (generally about 20 to 100 psig) and used primarily as fuel refinery equipment, such as for firing heaters and/or boilers, utilized in the refinery processes. These streams fuel gas streams are well known to those of skill in the art. While the light hydrocarbons do not have a high incremental value over being utilized as a fuel source, hydrogen does have a high incremental value over being utilized as a fuel source as it is valuable in many of the hydroprocessing processes described above. Compounding the problem is that due to its low BTU value, hydrogen is not a desirable fuel source as compared to the hydrocarbons in the stream and therefore, there is a significant economic reason for recovering a hydrogen-rich component stream from the refinery fuel gas.

In this embodiment, at least a portion of the hydrogen-containing fuel gas is sent to a swing adsorption unit of the present invention comprising a zeolitic imidazolate framework ("ZIF") material wherein the stream is separated into at least a $H_2$-rich effluent stream and a $H_2$-lean desorbed stream. Here, the $H_2$-rich effluent stream has a mol % concentration of hydrogen greater than the hydrogen-containing product stream. The $H_2$-rich effluent stream can then be utilized in processes such as those listed above that require high purity hydrogen to operate. Typically, the $H_2$-lean desorbed stream will contain most of the hydrocarbons that are in the fuel gas feedstream and can be returned for use as a fuel gas.

In a preferred embodiment of the present invention, the process feedstream (101) as exemplified by the swing processes (PSA or TSA) of FIG. 27 is comprised of a refinery fuel gas containing hydrogen and hydrocarbons wherein the $H_2$ in the process feedstream is selectively separated from the hydrocarbon components in the process feedstream. In additional preferred embodiments of the present invention, the $H_2$-rich stream (110) contains at least 70 mol % of the $H_2$ present in the process feedstream. More preferably, the $H_2$-rich stream (110) contains at least 80 mol % of the $H_2$ present in the process feedstream, and even more preferably, the $H_2$-rich stream (110) contains at least 85 mol % of the $H_2$ present in the process feedstream.

Yet another preferred process embodiment of the current invention is utilizing a PSA, TSA, or similar unit containing a ZIF material as described herein for removal of hydrogen from steam cracker product stream produced by either an ethylene or propylene steam cracking unit. A "steam cracking unit" as described is a petrochemical processing unit in which a hydrocarbon stream, comprising $C_2$ and heavier hydrocarbons, is cracked at temperatures typically above about 800° F. (427° C.) in the presence of steam and the substantial absence of additional hydrogen to produce an alkene-containing product stream. Preferably these alkenes are ethylene and/or propylene. In these steam cracking processes, hydrogen is produced and is a "contaminant" in the alkene-rich product stream. Most of the hydrogen in this product stream needs to be removed in order to purify the alkene product produced.

In this embodiment, at least a portion of the hydrogen-containing steam cracker product is sent to a swing adsorption unit of the present invention comprising a zeolitic imidazolate framework ("ZIF") material wherein the steam cracker product stream is separated into at least a $H_2$-rich effluent stream and a $H_2$-lean desorbed stream. Here, the $H_2$-rich effluent stream has a mol % concentration of hydrogen greater than the steam cracker product stream. The $H_2$-rich effluent stream can then be utilized in other petrochemical or petroleum refining processes requiring a hydrogen-containing stream. The $H_2$-lean stream is desorbed from the ZIF-containing adsorbent producing an improved purity alkene product stream.

This embodiment of the present invention is illustrated by the configuration of FIG. 27, wherein, the process feedstream (101) as exemplified by the swing processes (PSA or TSA) of FIG. 27 is comprised of a steam cracker product stream containing hydrogen and $C_{2+}$ alkenes (such as ethylene and/or propylene) wherein the $H_2$ in the steam cracker product stream is selectively separated from the alkene components present in the steam cracker product stream. In additional preferred embodiments of the present invention, the $H_2$-rich stream (110) contains at least 70 mol % of the $H_2$ present in the steam cracker product stream. More preferably, the $H_2$-rich stream (110) contains at least 80 mol % of the $H_2$ present in the steam cracker product stream, and even more preferably, the $H_2$-rich stream (110) contains at least 85 mol % of the $H_2$ present in the steam cracker product stream.

A significant benefit in the separations process of the present invention can be achieved over convention PSA processes by utilizing adsorbent materials comprised of certain ZIFs. It has been discovered herein that some of the ZIF materials exhibit a valuable feature in the design and operation of PSA processes, as well as a high adsorptive loading ratio for hydrocarbon components over $H_2$.

An additional benefit of the current processes is that the PSA adsorption process can be operated at very low pressures if required. As can be seen by the hydrogen and hydrocarbon loadings in particular for ZIF-1, ZIF-11, and ZIF-8 shown in FIGS. 20, 23, and 26, respectively, the ZIF materials as used in the present invention have significant loadings for hydrocarbons while the adsorptive loadings for hydrogen are virtually non-existent at essentially atmospheric conditions. This clearly shows their adequacy for low pressure separation of hydrogen from hydrocarbon contaminated streams. In other preferred embodiments of adsorption processes of the present invention, the hydrocarbon feed streams contact the ZIF or ZIF-containing adsorbent material at a suitably chosen temperature and process feedstream pressures of less than about 100 psia (690 kPa). In other embodiments, the hydrocarbon feed streams contact the ZIF or ZIF-containing adsorbent material at a suitably chosen temperature and process feedstream pressures of less than about 50 psia (345 kPa) or even less than about 30 psia (207 kPa). The ability of the present swing adsorption processes to make such a substantial separation of hydrogen from hydrocarbon compounds is very attractive especially in such processes as refinery fuel gas or waste gas recovery where the process streams may be available at relatively low pressures.

Figure 26:
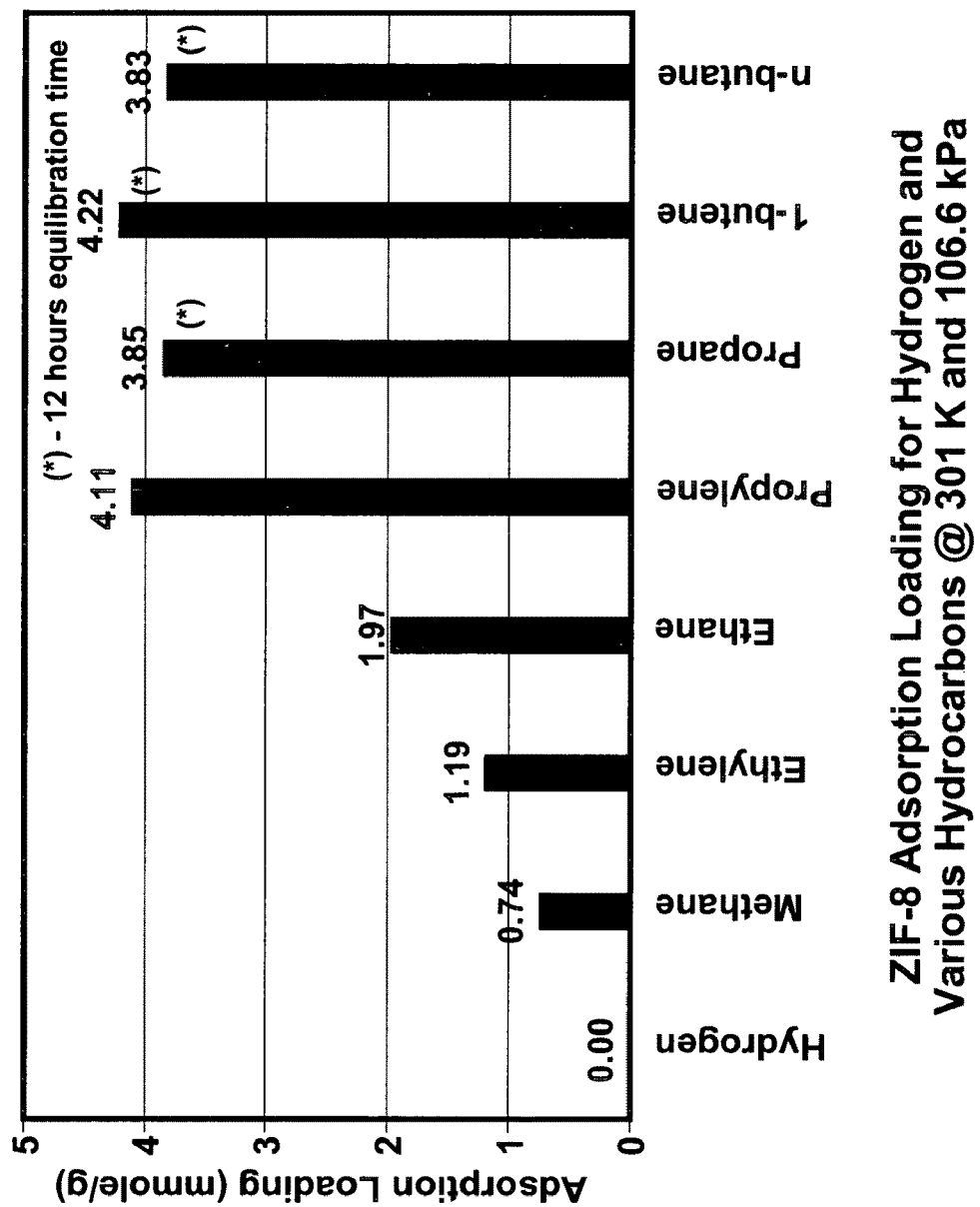
FIG. 26 is a bar graph comparing the adsorption loadings of a ZIF-8 sample of Example 10 for $H_2$ (hydrogen), $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at 301 K and 106.6 kPa.

With regard to high loadings at low pressures, for example, the sample of ZIF-8 from Example 5 and its corresponding adsorption loading at 301 K and 106.6 kPa from Example 10 shows a capacity for methane of about 0.74 mmole/g of methane at these substantially atmospheric pressure and temperature conditions (see FIG. 26). For the $C_2$ hydrocarbons, the capacity for ZIF-8 is over 1.0 mmole/g at these substantially atmospheric pressure and temperature conditions. This capacity increases to over 3.5 mmole/g at these substantially atmospheric pressure and temperature conditions for the $C_{3+}$ hydrocarbons. As discussed prior, ZIF materials, such as ZIF-1, ZIF-11, and ZIF-8, can be valuable adsorbent materials for low pressure PSA, TSA, and PSA/TSA processes.

It should be noted that although the processes of the present invention for separation of hydrocarbon compounds from $H_2$ in process feedstreams have been explained above primarily in terms of a swing adsorption configuration, the ZIF-containing membranes described above may also be utilized under similar process inlet conditions to selectively separate hydrocarbon compounds from $H_2$, and produce similar composition product streams as disclosed in the swing adsorption process embodiments above. In the processes utilizing ZIF-containing membranes to separate a hydrocarbon compound from $H_2$ in a process feedstream containing both components, it is desirable that the hydrocarbon compound selectively permeates through the ZIF-containing membrane process producing at least one $H_2$-rich retentate stream wherein the $H_2$-rich retentate stream has a higher mol % of $H_2$ than the process feedstream that contacts the ZIF-containing membrane. Additionally, at least one $H_2$-lean permeate stream is also produced by the process wherein the $H_2$-lean permeate stream has a lower mol % of $H_2$ than the process feedstream. The stream compositions, separations selectivities and properties of the final products produced by the ZIF-containing membrane process embodiments of the present invention are similar to those identified in the swing adsorption process embodiments described above.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

The Examples below are provided to illustrate the synthesis and the adsorption properties of a few select zeolitic imidazolate framework materials to illustrate the benefits of the present invention. These Examples only illustrate specific embodiments of the present invention and are not meant to limit the scope of the current invention.

EXAMPLES

In the following Examples 1 through 5, small amounts of Zeolitic Imidazolate Frameworks (or "ZIFs") samples were synthesized for use in testing for adsorption and separations processes that are described in detail in Examples 6 through 10. ZIFs are a unique type of microporous crystalline structures having framework topologies commonly found in zeolites and/or in other crystalline materials wherein each vertex is comprised of a single metal ion and each pair of connected adjacent vertices of the framework structure are linked by the nitrogen atoms of an imidazolate anion or its derivative. Each ZIF material with a specific type of solvent occluded is characterized by a unique X-ray diffraction pattern. However, due to the porous and flexible nature of ZIF framework structures, the X-ray diffraction pattern can be altered upon solvent-exchange or desolvation. The ZIF materials used in the gas adsorption screening studies were prepared according to published procedures with slight modifications in reaction scale and/or sample activation; see reference Park, K. S.; Ni, Z.; Côté, A. P.; Choi, J. Y.; Huang, R.; Uribe-Romo, F. J.; Chae, H. K.; O'Keeffe, M.; Yaghi, O. M. *Proc. Natl. Acad. Sci. U.S.A.* 2006, 103, 10186-10191, which is incorporated herein by reference and herein referred to as the "Park Reference".

The examples of ZIF materials provided herein are not meant to be limiting of the present invention in any manner. The general synthesis and structural characterization of some of the ZIF materials applicable to the present invention are presented in United States Patent Publication No. US2007/0202038A1 which is herein incorporated by reference.

Detailed synthesis procedures are described below in Examples 1 through 5 for selected ZIF materials.

Example 1

In this example, a ZIF-7 material was synthesized. The framework of ZIF-7 has a chemical composition of $ZnL_2$ (wherein L=benzimidazolate, i.e., the anion of benzimidazole) and a topology defined by the Zn cations that is identical to the zeolitic framework type SOD. SOD is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-7 material, 9.00 g of zinc nitrate tetrahydrate $(Zn(NO_3)_2.4H_2O$, 34.4 mmol) and 3.00 g of Benzimidazole (25.4 mmol) were dissolved in 900 ml DMF (N,N-Dimethylformamide) in a 1 liter glass jar. The jar was tightly capped and the reaction mixture was heated in an isothermal oven at 373 K for 48 hours. After reaction, the mother liquor was decanted. The solid crystallized on the side wall and the bottom part of the jar was collected, washed with and stored in DMF and labeled "as-synthesized ZIF-7".

In order to activate the ZIF-7, the as-synthesized solid was heated under vacuum at 473 K for 24 hours, transferred to a 120 ml vial, immersed in acetonitrile (c.a. 100 ml) and soaked at 348 K for 48 hours. The acetonitrile-exchanged ZIF-7 was loaded in a glass tube and evacuated on a vacuum line apparatus at room-temperature for 16 hours to remove the solvent molecules residing in its pores. 2.10 g of activated ZIF-7 was obtained, corresponding to 55% yield (based on Benzimidazole).

For gas adsorption experiments, the acetonitrile-exchanged ZIF-7 was loaded directly in the sample holder of the gravimetric gas-adsorption unit and activated in-situ by using the conditions described in Example 6.

FIG. 1 shows a comparison of the experimental powder X-ray diffraction ("PXRD") patterns of the as-synthesized and the acetonitrile-exchanged ZIF-7 samples and the calculated PXRD pattern (shown as the stick pattern) based on the single crystal structure of ZIF-7 reported in the "Park Reference" as referenced herein. The PXRD patterns as shown in FIG. 1 are plotted as the diffraction intensity (in arbitrary units) against the diffraction angle two theta (in degrees).

The high purity of the as-synthesized ZIF-7 sample is evidenced by the coincidence of experimental and calculated PXRD patterns. It is worth noting the slight differences between the two experimental PXRD patterns of ZIF-7. The pattern of as-synthesized ZIF-7 is indexed to rhombohedral space group R$\bar{3}$, a=b=22.927 Å, c=15.603 Å whereas the pattern of acetonitrile-exchanged ZIF-7 is indexed to the same space group with a=b=22.522 Å and c=15.760 Å. The data suggest a slight distortion of the unit cell of ZIF-7 upon solvent-exchange.

Figure 2:
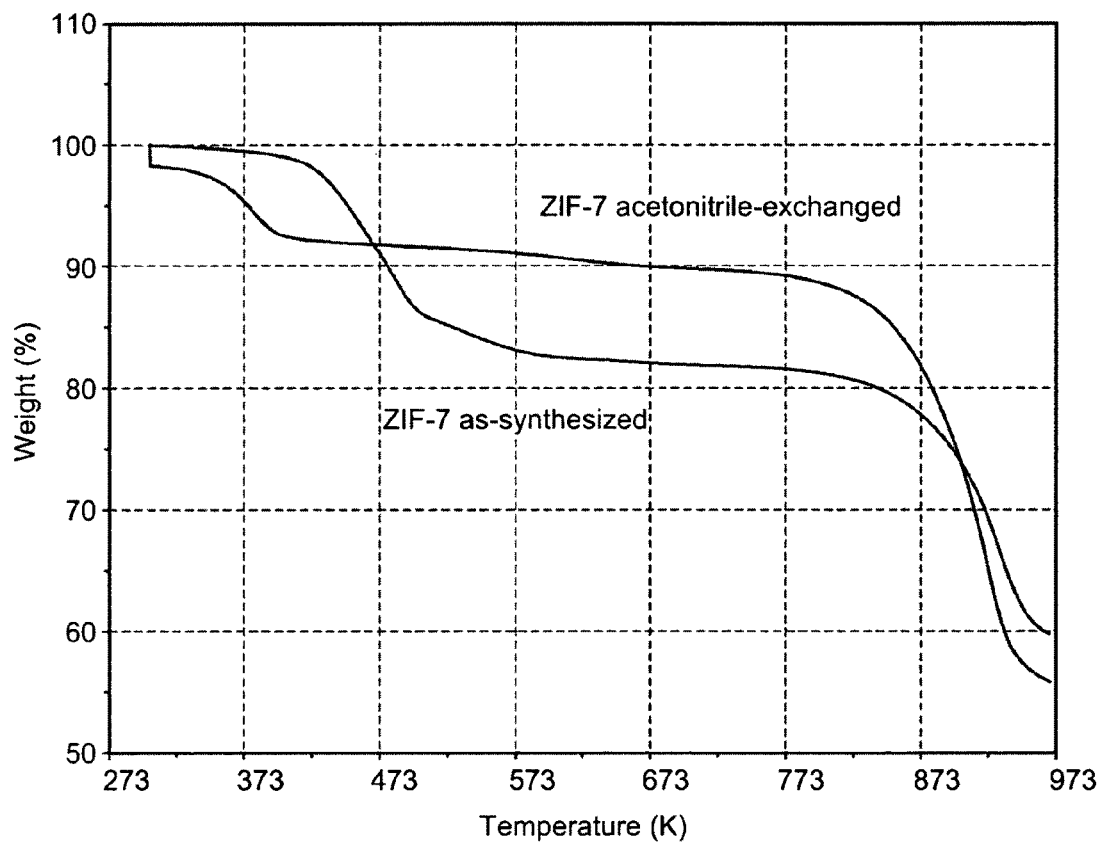
FIG. 2 shows the thermogravimetric analyses ("TGA"s) for the as-synthesized and acetonitrile-exchanged ZIF-7 samples of Example 1 herein.

FIG. 2 shows the thermogravimetric analyses ("TGA") for the as-synthesized and the acetonitrile-exchanged ZIF-7 samples in nitrogen atmosphere. The activation conditions described above were chosen based on TGA data.

Figure 11:
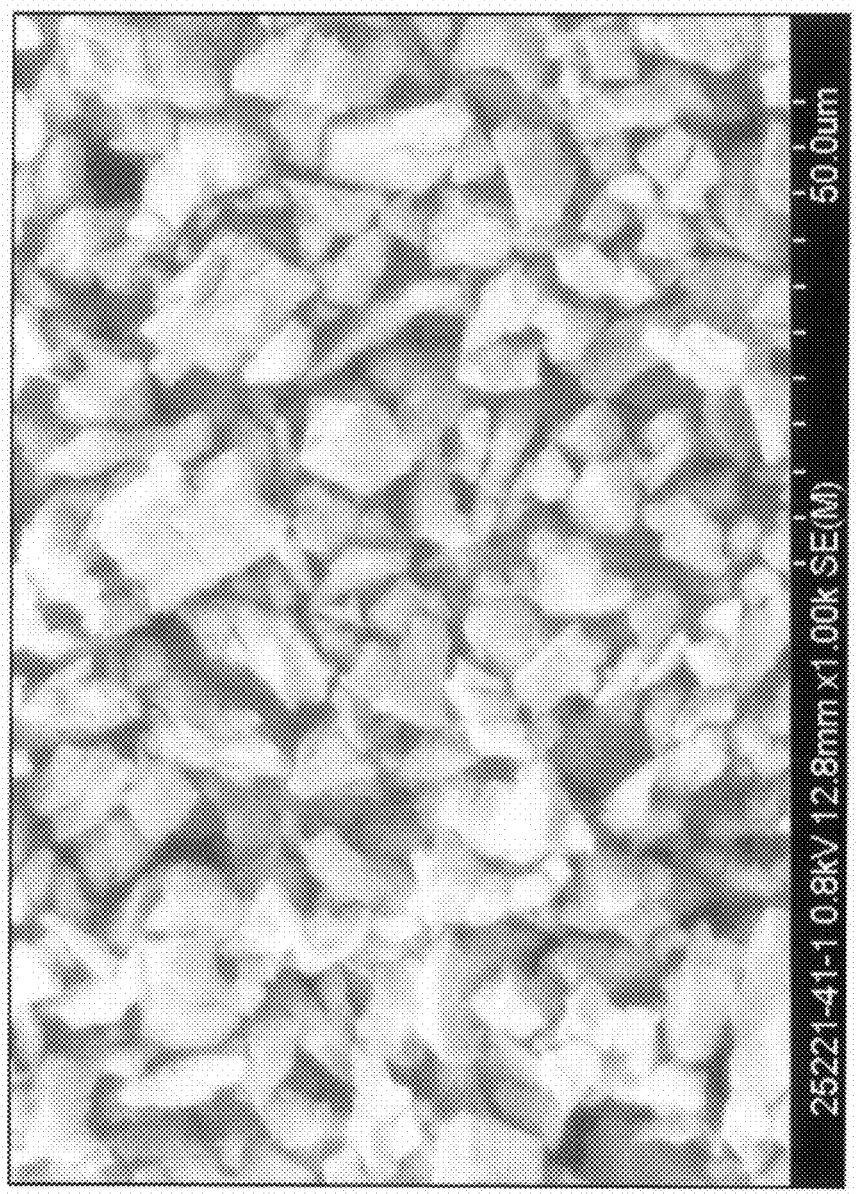
FIG. 11 is a Scanning Electron Microscopy ("SEM") image of a ZIF-7 sample of Example 6.

FIG. 11 is a Scanning Electron Microscopy ("SEM") image of a sample of ZIF-7 produced.

Example 2

In this example, a ZIF-9 material was synthesized. The framework of ZIF-9 has a chemical composition of $CoL_2$ (wherein L=benzimidazolate, i.e., the anion of benzimidazole) and a topology defined by the Co cations that is identical to the zeolitic framework type SOD. SOD is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-9 material, 1.26 g of cobalt nitrate hexahydrate ($Co(NO_3)_2 \cdot 6H_2O$, 4.33 mmol) and 0.360 g of Benzimidazole (3.05 mmol) were dissolved in 108 ml DMF (N,N-Dimethylformamide) in a 120 ml vial. The vial was tightly capped and the reaction mixture was heated in an isothermal oven at 373 K for 96 hours. After reaction, the mother liquor was decanted. The solid crystallized on the side wall and the bottom part of the jar was collected, washed with and stored in DMF and labeled "as-synthesized ZIF-9".

In order to activate the ZIF-9, the as-synthesized solid was heated under vacuum at 473 K for 24 hours, transferred to a 20 ml vial, immersed in acetonitrile (c.a. 15 ml) and soaked at 348 K for 48 hours. The acetonitrile-exchanged ZIF-9 was loaded in a glass tube and evacuated on a vacuum line apparatus at room-temperature for 16 hours to remove the solvent molecules residing in its pores. 0.07 g of activated ZIF-9 was obtained, corresponding to 15% yield (based on Benzimidazole).

For gas adsorption experiments, the acetonitrile-exchanged ZIF-9 was loaded directly in the sample holder of the gravimetric gas adsorption unit and activated in-situ by using the conditions described in Example 7.

Figure 3:
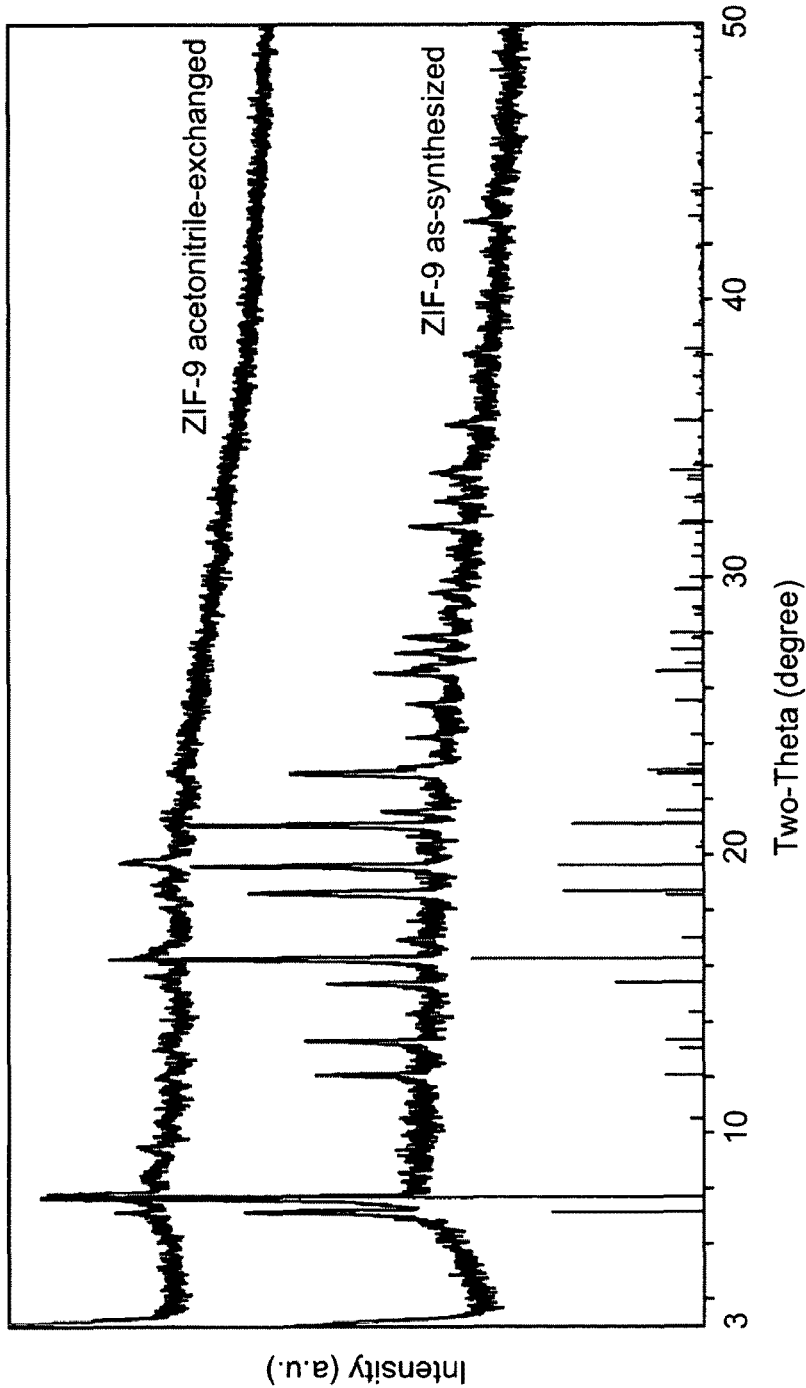
FIG. 3 is the experimental powder X-ray diffraction ("PXRD") patterns of the as-synthesized and acetonitrile-exchanged ZIF-9 samples of Example 2 herein. The calculated PXRD pattern (shown as the vertical stick patterns in the figure) for ZIF-9 based on the single crystal structure of ZIF-9 reported in the "Park Reference" as referenced herein is also shown in the figure.

FIG. 3 shows a comparison of the experimental powder X-ray diffraction ("PXRD") patterns of the as-synthesized and the acetonitrile-exchanged ZIF-9 samples and the calculated PXRD pattern (shown as the stick pattern) based on the single crystal structure of ZIF-9 reported in the "Park Reference" as referenced herein. The PXRD patterns as shown in FIG. 3 are plotted as the diffraction intensity (in arbitrary units) against the diffraction angle two theta (in degrees).

The high purity of the as-synthesized ZIF-9 sample is evidenced by the coincidence of experimental and calculated PXRD patterns. The relatively large background in the PXRD pattern of the as-synthesized ZIF-9 sample cannot be attributed to the existence of amorphous impurities because only purple cubic crystals are observed within the sample by optical microscopy. The PXRD data suggests that Co-containing ZIF-9 is intrinsically of lower crystallinity when compared to its isomorphous Zn-containing material ZIF-7 (comparing FIGS. 1 and 3).

Figure 4:
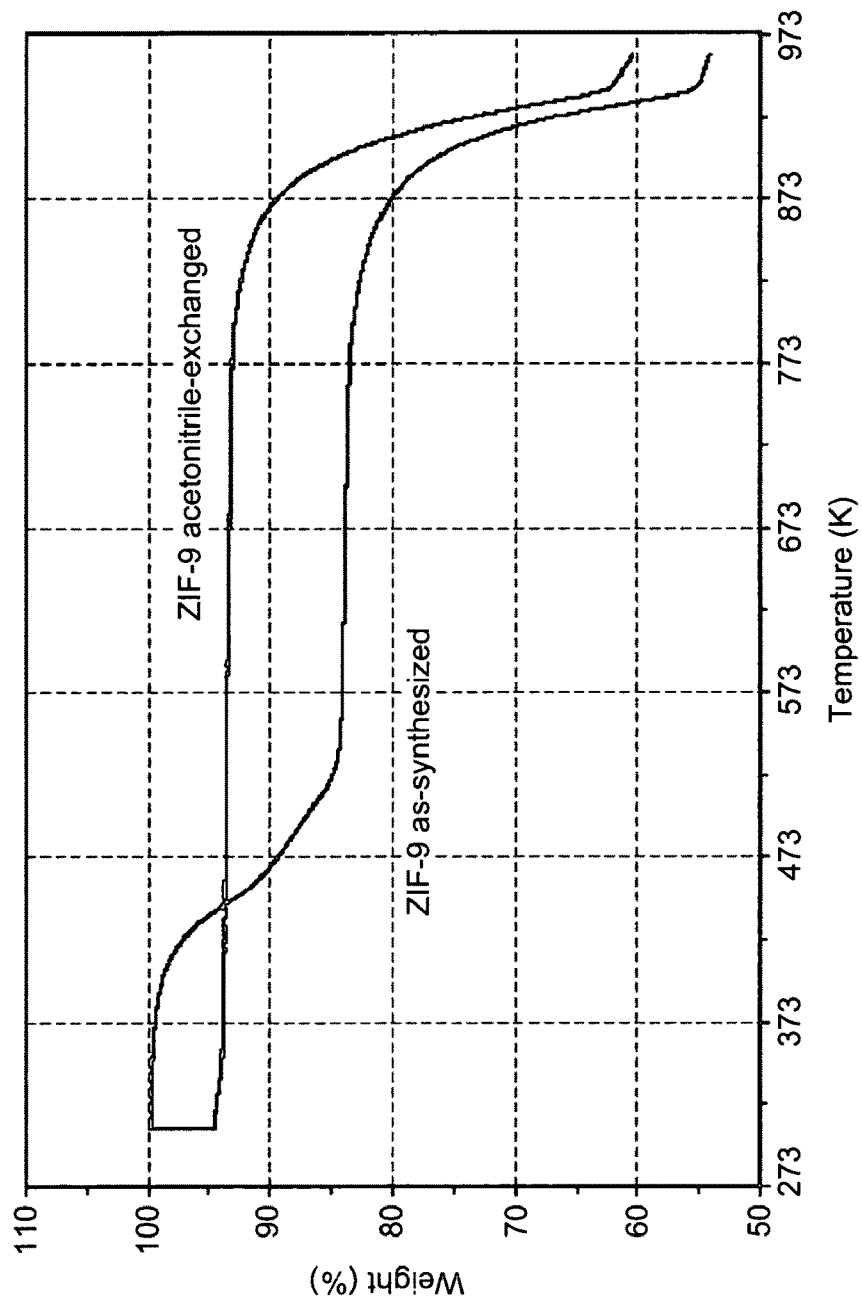
FIG. 4 shows the thermogravimetric analyses ("TGA"s) for the as-synthesized and acetonitrile-exchanged ZIF-9 samples of Example 2 herein.

FIG. 4 shows the thermogravimetric analyses ("TGA") for the as-synthesized and the acetonitrile-exchanged ZIF-9 samples in nitrogen atmosphere. The activation conditions described above were chosen based on TGA data.

Figure 14:
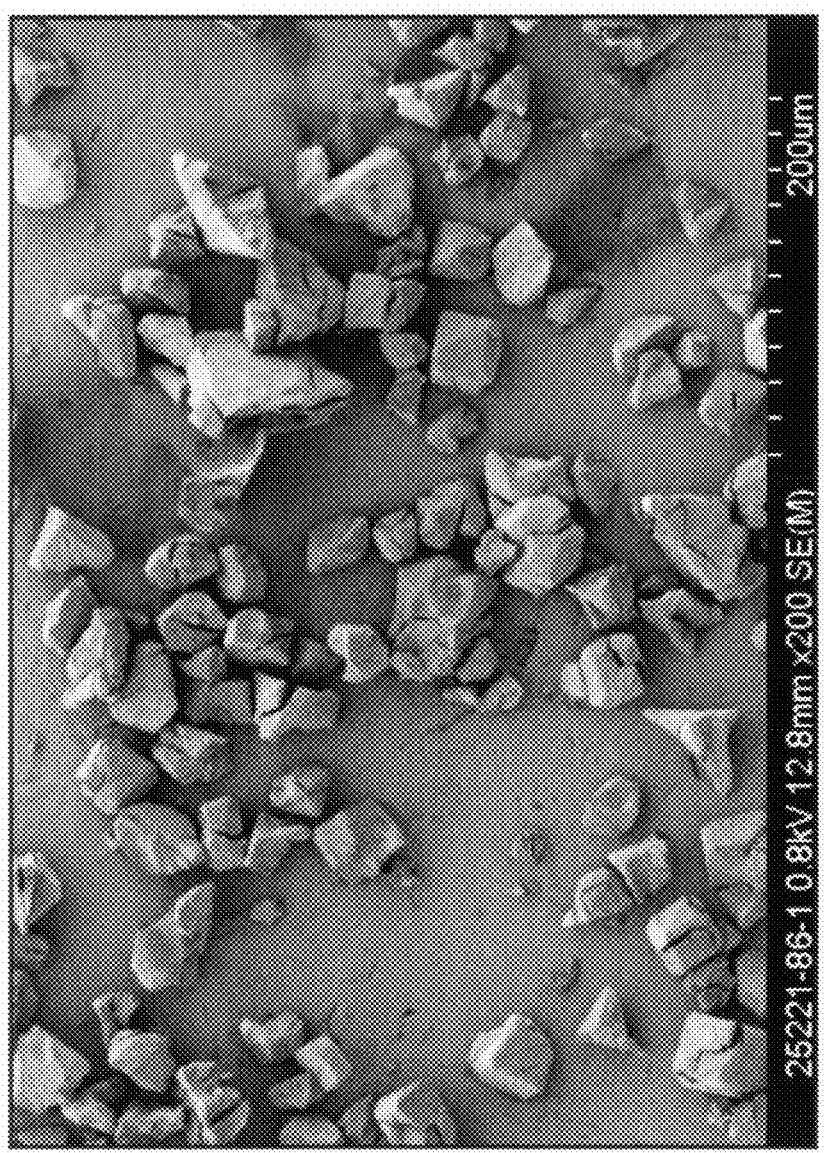
FIG. 14 is a Scanning Electron Microscopy ("SEM") image of a ZIF-9 sample of Example 7.

FIG. 14 is a Scanning Electron Microscopy ("SEM") image of a sample of ZIF-9 produced.

Example 3

In this example, a ZIF-1 material was synthesized. The framework of ZIF-1 has a chemical composition of $ZnL_2$ (wherein L=imidazolate, i.e., the anion of imidazole) and a topology defined by the Zn cations that is identical to the zeolitic framework type BCT. BCT is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-1 material, 1.25 g of zinc nitrate tetrahydrate ($Zn(NO_3)_2 \cdot 4H_2O$, 4.77 mmol) and 2.75 g of Imidazole (40.4 mmol) were dissolved in 100 ml DMAc (N,N-Dimethylacetamide) in a 120 ml glass vial. The vial was tightly capped and the reaction mixture was heated in an isothermal oven at 358 K for 72 hours. After reaction, the mother liquor was decanted. The solid crystallized on the side wall and the bottom part of the vial was collected and washed with DMF (N,N-Dimethylformamide) to remove any residual mother liquor. The product was then transferred to a 20 ml vial, stored in DMF and labeled "as-synthesized ZIF-1".

In order to activate the ZIF-1, the as-synthesized solid was immersed in acetonitrile (c.a. 15 ml) for a total of 72 hours. The solvent volume was replaced every 24 hours. The acetonitrile-exchanged ZIF-1 was loaded in a glass tube and evacuated on a vacuum line apparatus at room temperature for 16 hours to remove the solvent molecules residing in its pores. 0.13 g of activated ZIF-1 was obtained, corresponding to 14% yield (based on zinc nitrate tetrahydrate). Alternatively, the as-synthesized ZIF-1 was activated by exchanging with toluene followed by heating under vacuum at 443 K for 2 hours.

For gas adsorption experiments, the acetonitrile-exchanged or toluene-exchanged ZIF-1 was loaded directly in the sample holder of the gravimetric gas adsorption unit and activated in-situ by using the conditions described in Example 8.

Figure 5:
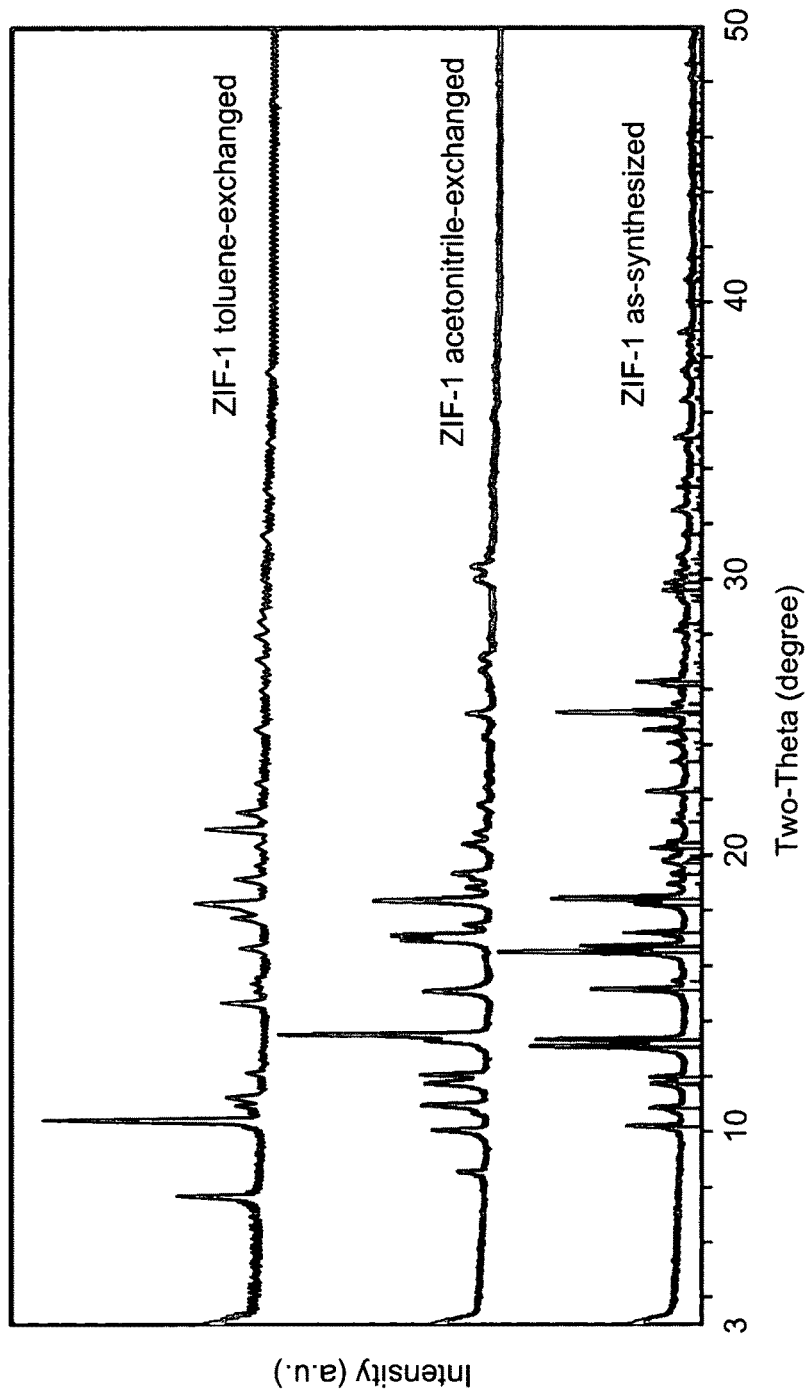
FIG. 5 is the experimental powder X-ray diffraction ("PXRD") patterns of the as-synthesized, the acetonitrile-exchanged and the toluene-exchanged ZIF-1 samples of Example 3 herein. The calculated PXRD pattern (shown as the vertical stick patterns in the figure) for ZIF-1 based on the single crystal structure of ZIF-1 reported in the "Park Reference" as referenced herein is also shown in the figure.

FIG. 5 shows a comparison of the experimental powder X-ray diffraction ("PXRD") patterns of the as-synthesized, the acetonitrile-exchanged and the toluene-exchanged ZIF-1 samples and the calculated PXRD pattern (shown as the stick pattern) based on the single crystal structure of ZIF-1 reported in the "Park Reference" as referenced herein. The PXRD patterns as shown in FIG. 5 are plotted as the diffraction intensity (in arbitrary units) against the diffraction angle two theta (in degrees).

The high purity of the as-synthesized ZIF-1 sample is evidenced by the coincidence of experimental and calculated PXRD patterns. It is worth noting the differences between the three experimental PXRD patterns of ZIF-1. The pattern of as-synthesized ZIF-1 is indexed to monoclinic space group $P2_1/c$, a=9.699 Å, b=15.185 Å, c=16.555 Å, β=116.9° whereas the pattern of acetonitrile-exchanged ZIF-1 is indexed to the same space group with a=10.098 Å, b=14.649 Å, c=17.300 Å, β=119.5° and pattern of toluene-exchanged ZIF-1 is indexed to a space group of orthorhombic symmetry Pnn2 with a=15.708 Å. b=9.455 Å, c=16.969 Å. The data suggest distortions of the unit cell of ZIF-1 upon solvent-exchange. We point out that high-symmetry analog of ZIF-1 does exist. The single crystal structure of such a component was reported in the "Park Reference" as referenced herein (ZIF-2 having the same framework topology as ZIF-1, orthorhombic, Pbca, a=9.679 Å. b=24.114 Å, c=24.450 Å).

Figure 6:
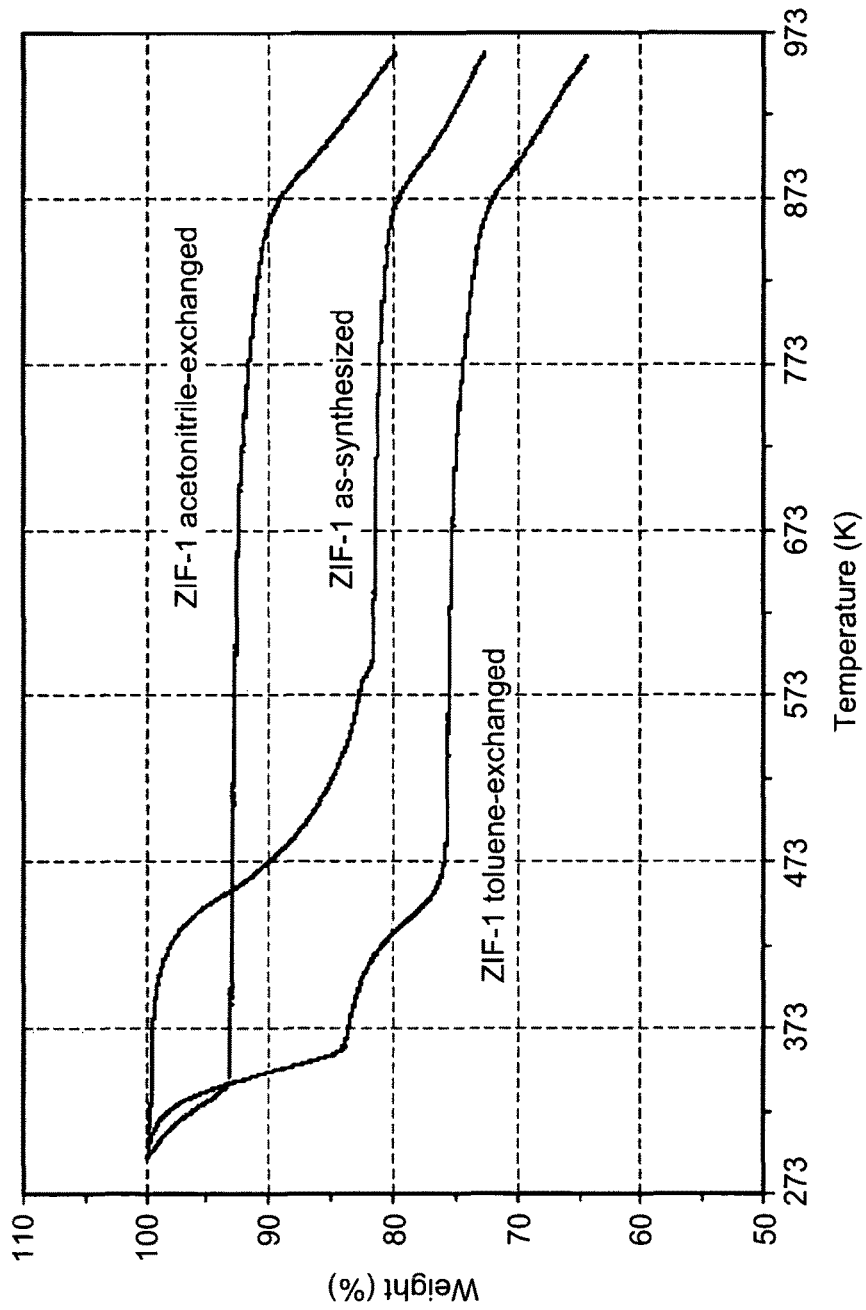
FIG. 6 shows the thermogravimetric analyses ("TGA"s) for the as-synthesized, the acetonitrile-exchanged and the toluene-exchanged ZIF-1 samples of Example 3 herein.

FIG. 6 shows the thermogravimetric analyses ("TGA") for the as-synthesized, the acetonitrile-exchanged and the toluene-exchanged ZIF-1 samples in nitrogen atmosphere. The activation conditions described above were chosen based on TGA data.

Figure 17:
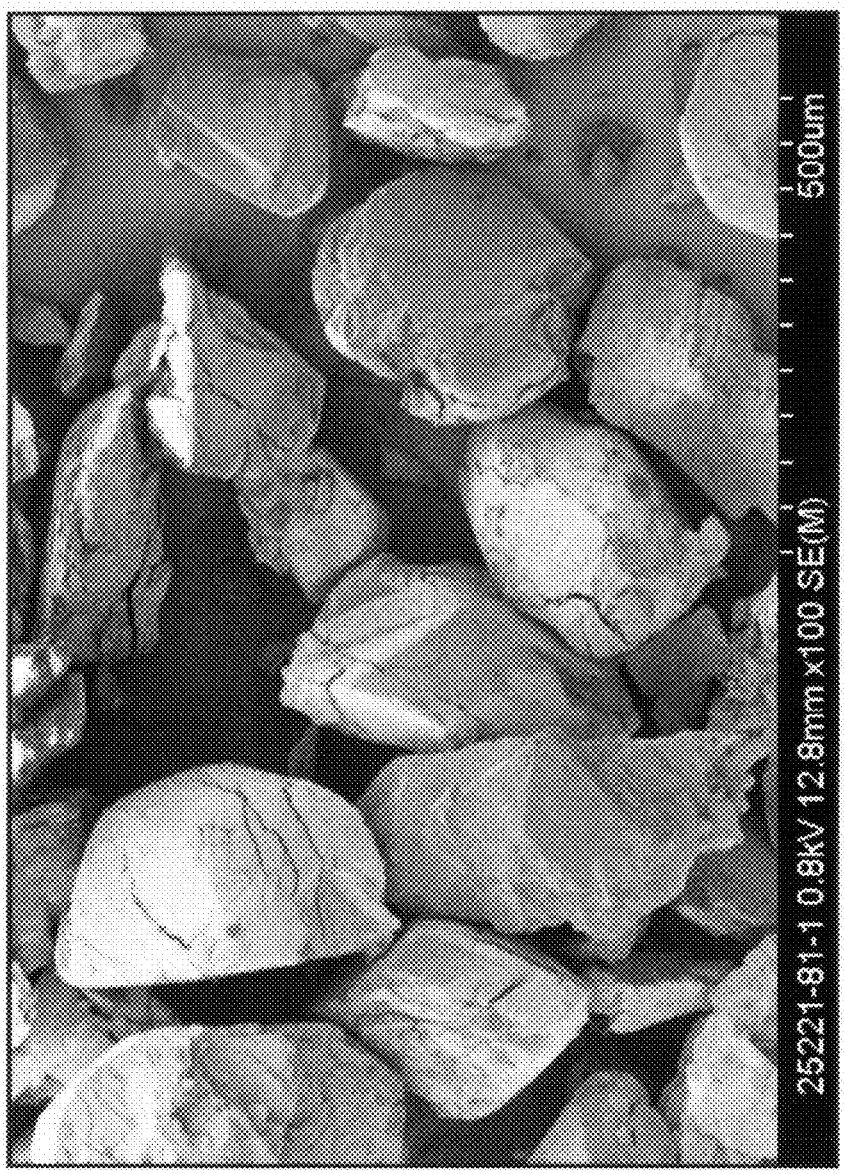
FIG. 17 is a Scanning Electron Microscopy ("SEM") image of a ZIF-1 (acetonitrile-exchanged) sample of Example 8.
Figure 18:
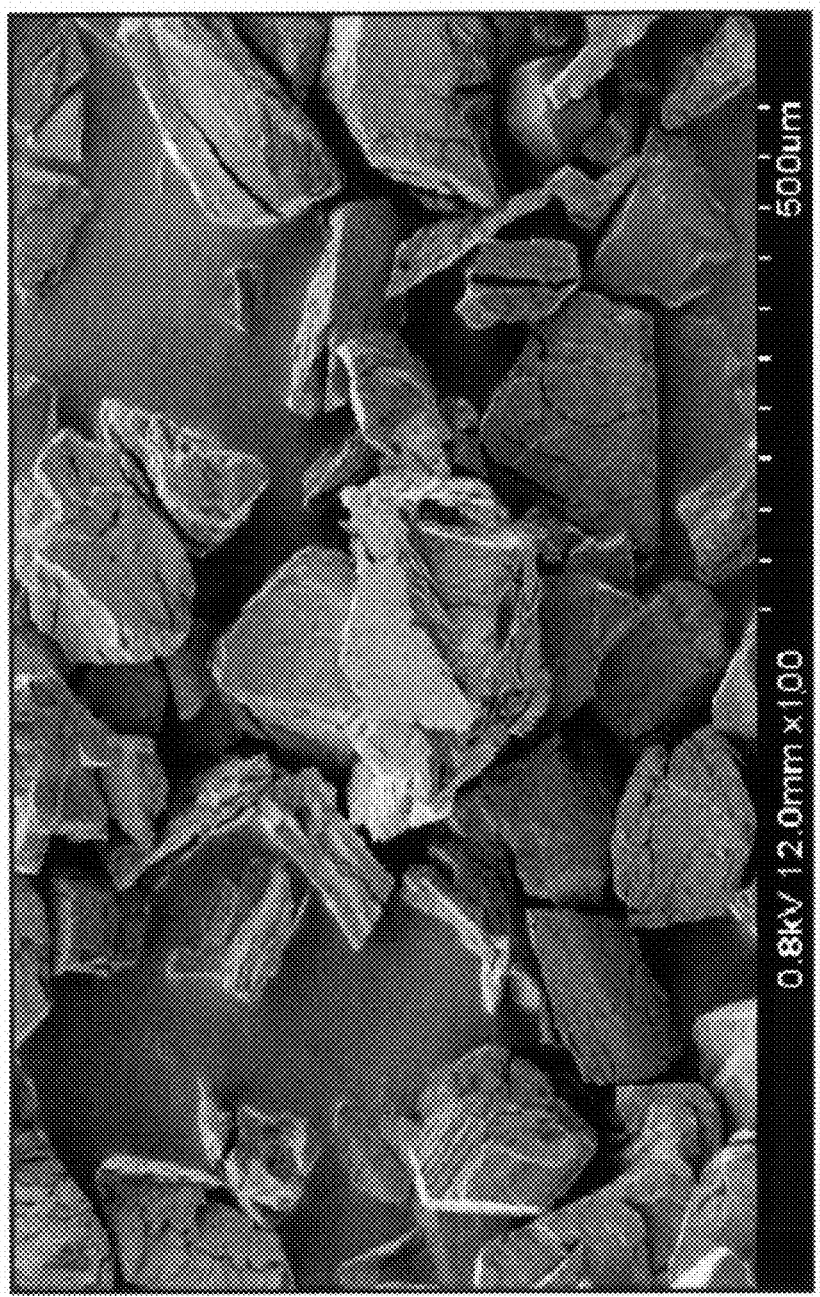
FIG. 18 is a Scanning Electron Microscopy ("SEM") image of a ZIF-1 (toluene-exchanged) sample of Example 8.

FIG. 17 is a Scanning Electron Microscopy ("SEM") image of a sample of ZIF-1 (acetonitrile-exchanged) produced. FIG. 18 is a Scanning Electron Microscopy ("SEM") image of a sample of ZIF-1 (toluene-exchanged) produced.

Example 4

In this example, a ZIF-11 material was synthesized. The framework of ZIF-11 has a chemical composition of $ZnL_2$ (wherein L=benzimidazolate, i.e., the anion of benzimidazole) and a topology defined by the Zn cations that is identical to the zeolitic framework type RHO. RHO is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-11 material, 0.330 g of zinc nitrate hexahydrate ($Zn(NO_3)_2.6H_2O$, 1.11 mmol) and 0.990 g of Benzimidazole (8.38 mmol) were dissolved in 100 ml DEF (N,N-Diethylformamide) in a 120 ml glass vial. The vial was tightly capped and the reaction mixture was heated in an isothermal oven at 373 k for 96 hours. After reaction, the mother liquor was decanted. The solid crystallized on the side wall and the bottom part of the vial was collected and washed with DMF (N,N-Dimethylformamide) repeatedly to remove any residual mother liquor and an amorphous by-product. The product was then transferred to a 20 ml vial and the DMF solvent was decanted. After the addition of chloroform (c.a. 15 ml), the vial was capped and the mixture was immersed in an ultrasonic bath for 30 minutes to mechanically detach an unidentified dense-phase from the surfaces of ZIF-11 crystals. Two layers of solids appeared after the vial sat on a level surface undisturbed for 30 minutes. The solid layer floating on the surface of chloroform was carefully collected using a pipette and transferred to another 20 ml vial. The solid was washed with and stored in DMF and labeled "purified ZIF-11".

In order to activate the ZIF-11, the purified solid was immersed in methanol (c.a. 15 ml) for a total of 72 hours. The solvent volume was replaced every 24 hours. The methanol-exchanged ZIF-11 was loaded in a glass tube and evacuated on a vacuum line apparatus. After the removal of external methanol solvent at room temperature, the solid was heated under vacuum at 423 K for 16 hours to remove the solvent molecules residing in the pores of the ZIF-11. A 0.09 g sample of activated ZIF-11 was thus obtained, corresponding to 27% yield (based on zinc nitrate hexahydrate).

For gas adsorption experiments, the methanol-exchanged ZIF-11 was loaded directly in the sample holder of the gravimetric gas adsorption unit and activated in-situ by using the conditions described in Example 9.

Figure 7:
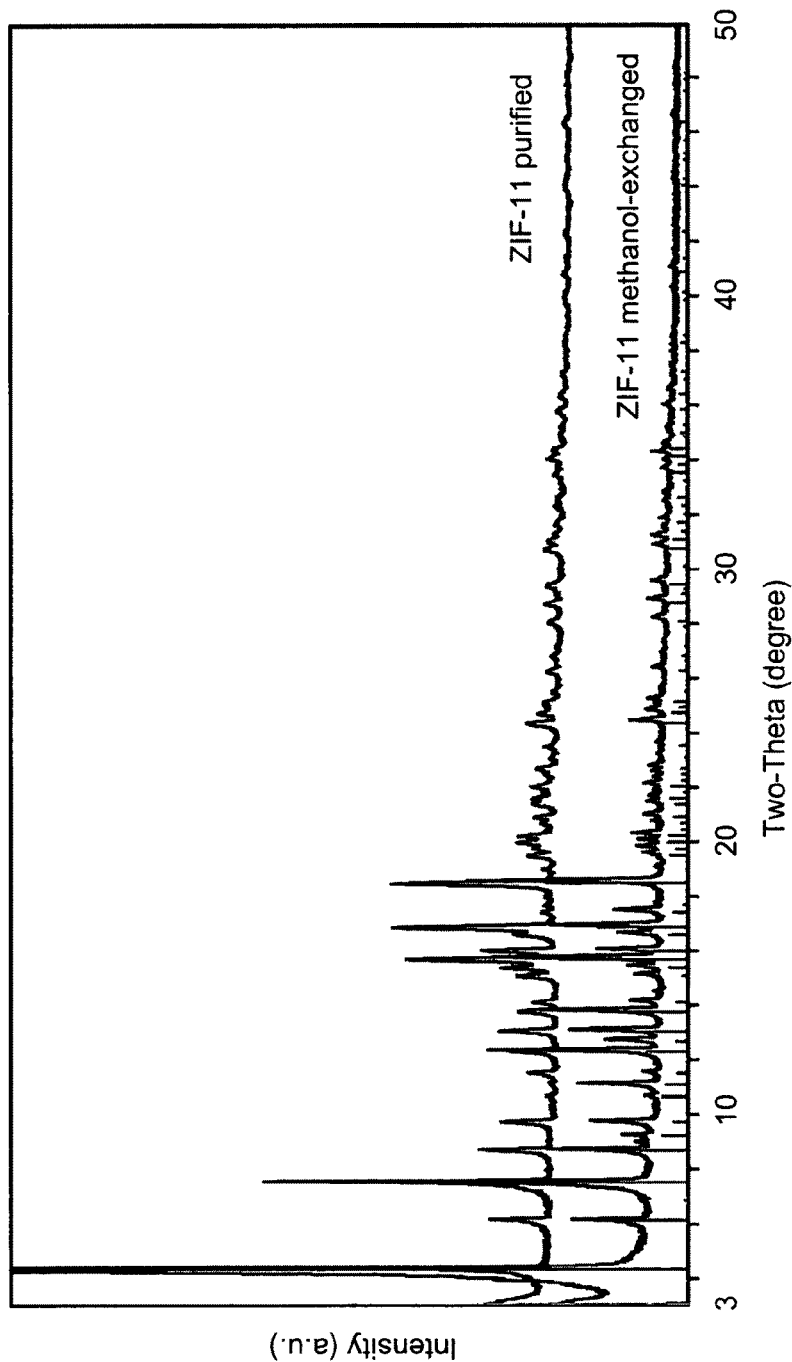
FIG. 7 is the experimental powder X-ray diffraction ("PXRD") patterns of the purified and methanol-exchanged ZIF-11 samples of Example 4 herein. The calculated PXRD pattern (shown as the vertical stick patterns in the figure) for ZIF-11 based on the single crystal structure of ZIF-11 reported in the "Park Reference" as referenced herein is also shown in the figure.

FIG. 7 shows a comparison of the experimental powder X-ray diffraction ("PXRD") patterns of the purified and the methanol-exchanged ZIF-11 samples and the calculated PXRD pattern (shown as the stick pattern) based on the single crystal structure of ZIF-11 reported in the "Park Reference" as referenced herein. The PXRD patterns as shown in FIG. 7 are plotted as the diffraction intensity (in arbitrary units) against the diffraction angle two-theta (in degrees).

The high purity of the sample is evidenced by the coincidence of experimental and calculated PXRD patterns. It is worth noting the slight differences between the two experimental PXRD patterns of ZIF-11. After methanol-exchange, the intensities of the diffraction peaks were altered and the peak positions were systematically shifted to higher two-theta angle (in degrees).

Figure 8:
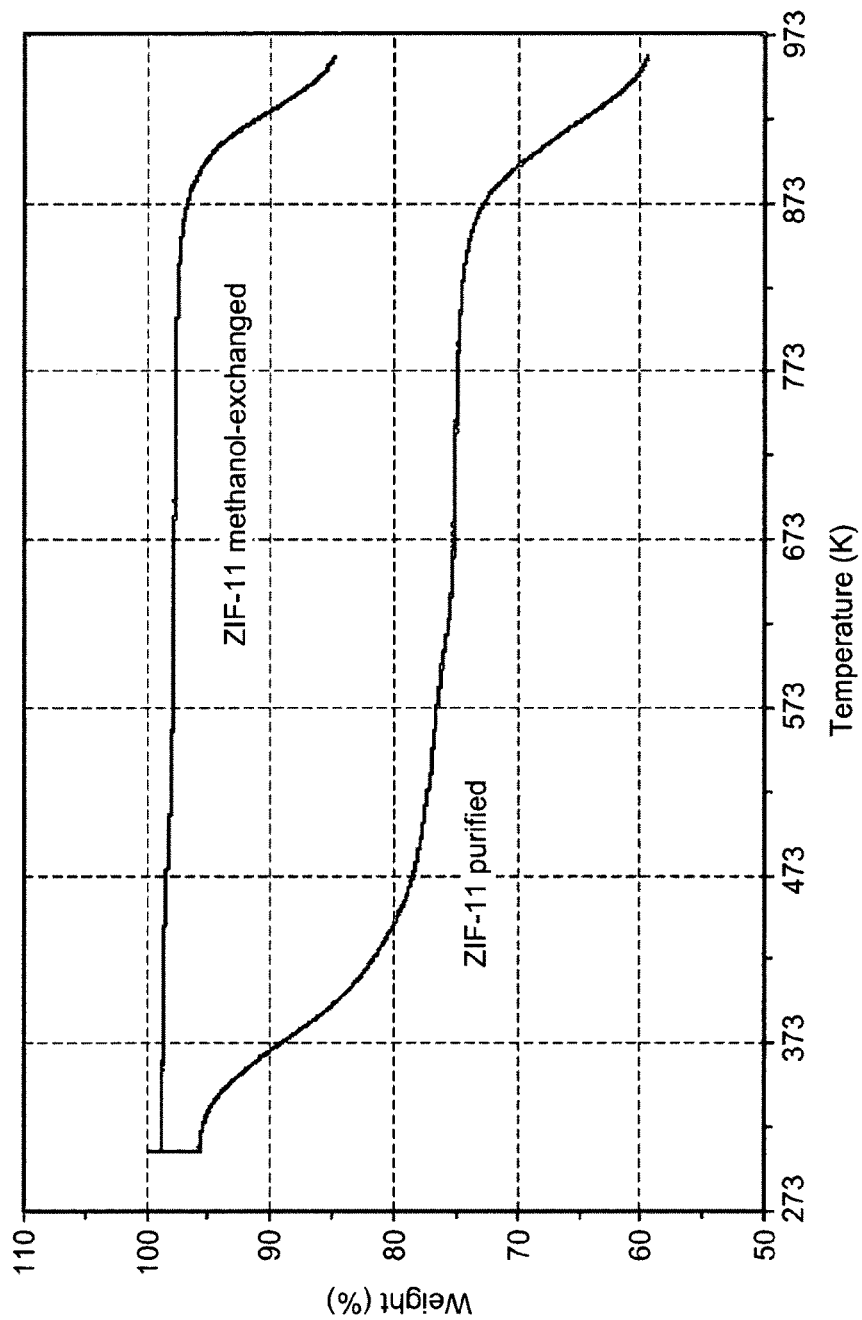
FIG. 8 shows the thermogravimetric analyses ("TGA"s) for the purified and methanol-exchanged ZIF-11 samples of Example 4 herein.

FIG. 8 shows the thermogravimetric analyses ("TGA") for the purified and the methanol-exchanged ZIF-11 samples in nitrogen atmosphere. The activation conditions described above were chosen based on TGA data.

Figure 21:
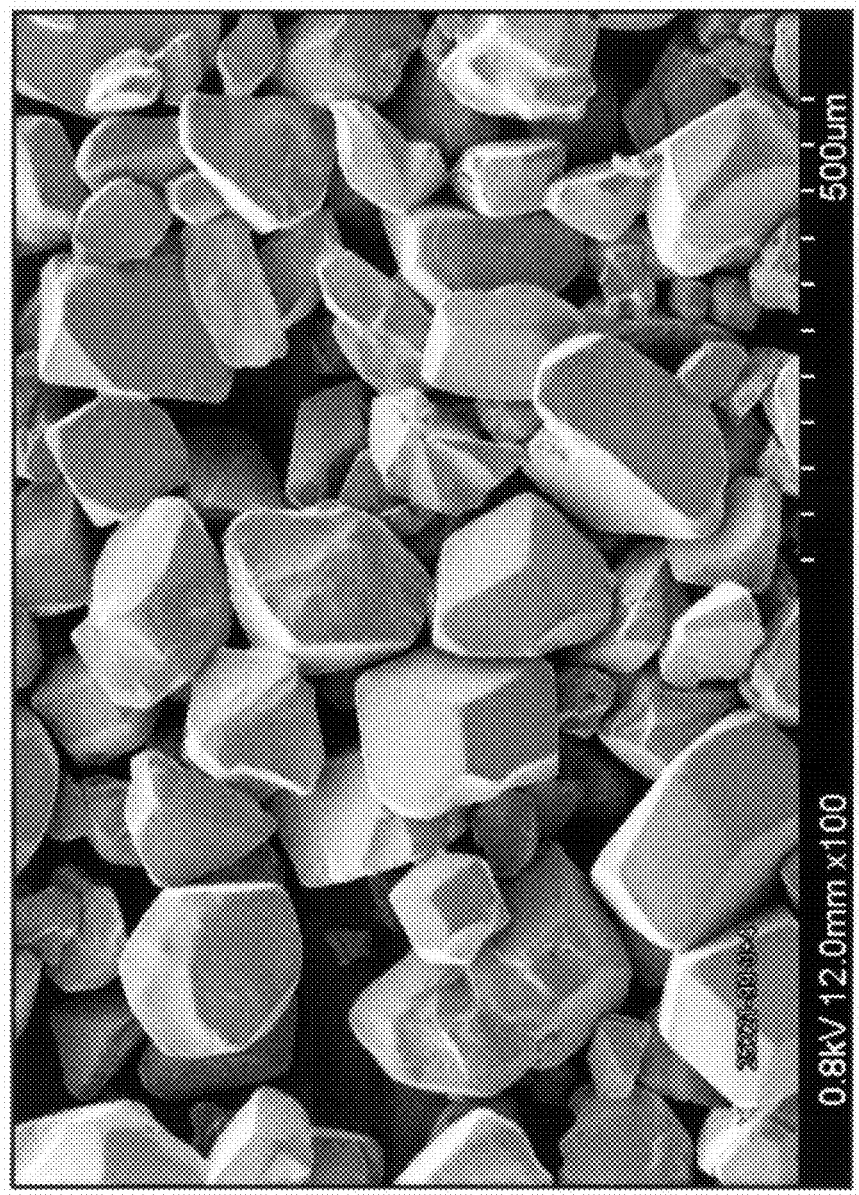
FIG. 21 is a Scanning Electron Microscopy ("SEM") image of a ZIF-11 sample of Example 9.

FIG. 21 is a Scanning Electron Microscopy ("SEM") image of a sample of ZIF-11 produced.

Example 5

In this example, a ZIF-8 material was synthesized. The framework of ZIF-8 has a chemical composition of $ZnL_2$ (wherein L=2-Methylimidazolate, i.e., the anion of 2-Methylimidazole) and a topology defined by the Zn cations that is identical to the zeolitic framework type SOD. SOD is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-8 material, 10.50 g of zinc nitrate tetrahydrate ($Zn(NO_3)_2.4H_2O$, 40.2 mmol) and 3.00 g of 2-Methylimidazole (36.5 mmol) were dissolved in 900 ml DMF (N,N-Dimethylformamide) in a 1 liter glass jar. The jar was tightly capped and the reaction mixture was heated in an isothermal oven at 413 K for 24 hours. After reaction, the mother liquor was decanted. The solid crystallized on the side wall and the bottom part of the jar was collected and washed with DMF repeatedly to remove any residual mother liquor and an amorphous by-product. The product was then transferred to a 120 ml vial and the DMF solvent was decanted. After the addition of chloroform (c.a. 100 ml), the vial was capped and the mixture was immersed in an ultrasonic bath for 30 minutes to mechanically detach zinc oxide particles from the surfaces of ZIF-8 crystals. Two layers of solids appeared after the vial sat on a level surface undisturbed for 30 minutes. The solid layer floating on the surface of chloroform was carefully collected using a pipette and transferred to another 120 ml vial. The solid was washed with and stored in DMF and labeled "purified ZIF-8".

In order to activate the ZIF-8, the purified solid was immersed in methanol (c.a. 100 ml) for a total of 72 hours. The solvent volume was replaced every 24 hours. This methanol-exchanged ZIF-8 was loaded in a glass tube and, evacuated on a vacuum line apparatus. After the removal of external methanol solvent at room-temperature, the solid was heated under vacuum at 523 K for 16 hours to remove the solvent molecules residing in the pores of ZIF-8. 1.70 g of activated ZIF-8 was obtained, corresponding to 41% yield (based on 2-Methylimidazole).

For gas adsorption experiments, the methanol-exchanged ZIF-8 was loaded directly in the sample holder of the gravimetric gas adsorption unit and activated in-situ by using the conditions described in Example 10.

Figure 9:
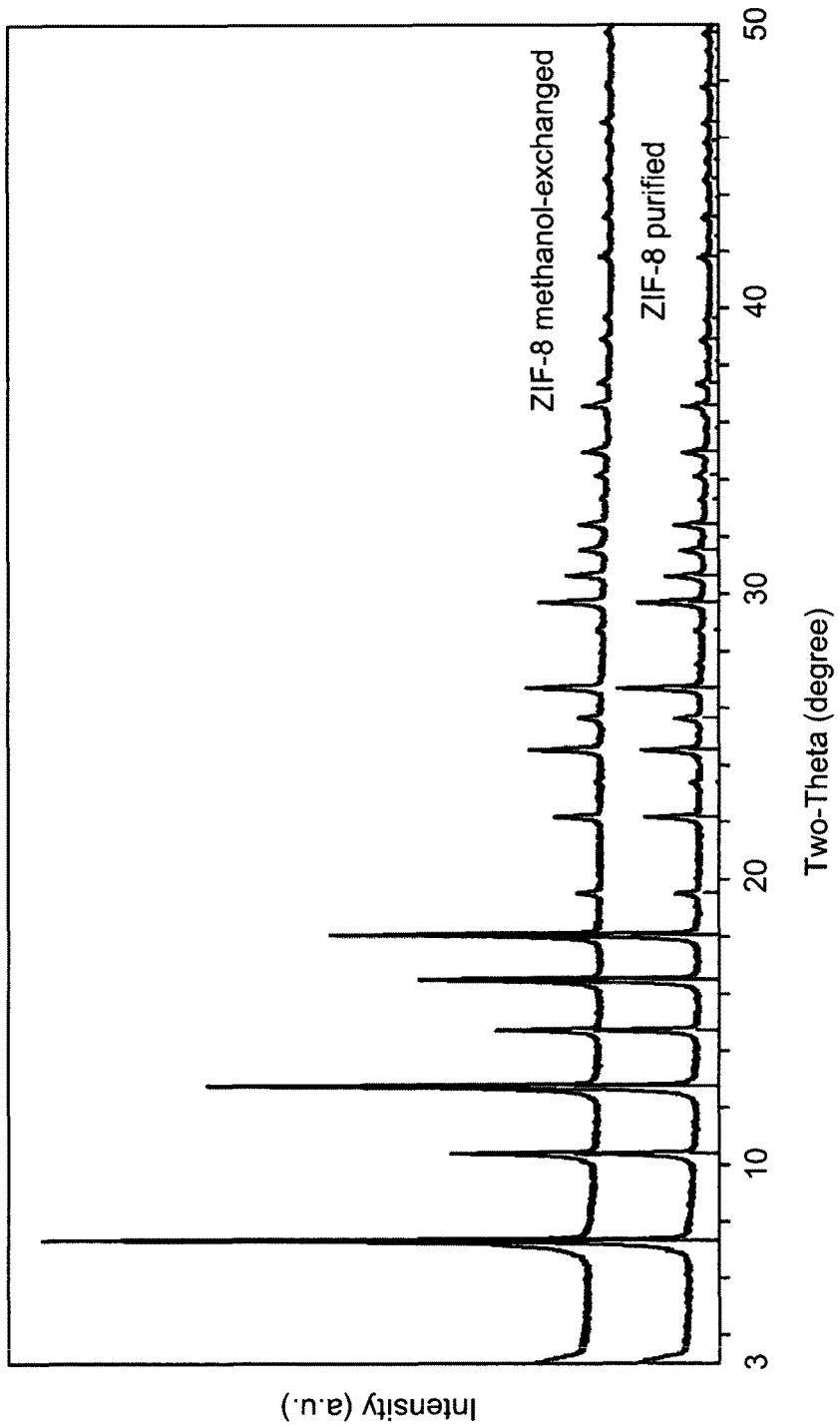
FIG. 9 is the experimental powder X-ray diffraction ("PXRD") patterns of the purified and methanol-exchanged ZIF-8 samples of Example 5 herein. The calculated PXRD pattern (shown as the vertical stick patterns in the figure) for ZIF-8 based on the single crystal structure of ZIF-8 reported in the "Park Reference" as referenced herein is also shown in the figure.

FIG. 9 shows a comparison of the experimental powder X-ray diffraction ("PXRD") patterns of the purified and the methanol-exchanged ZIF-8 samples and the calculated PXRD pattern (stick pattern) based on the single crystal structure of ZIF-8 reported in the "Park Reference" as referenced herein. The high purity of the sample is evidenced by the coincidence of experimental and calculated PXRD patterns. The PXRD patterns as shown in FIG. 9 are plotted as the diffraction intensity (in arbitrary units) against the diffraction angle two theta (in degrees).

Figure 10:
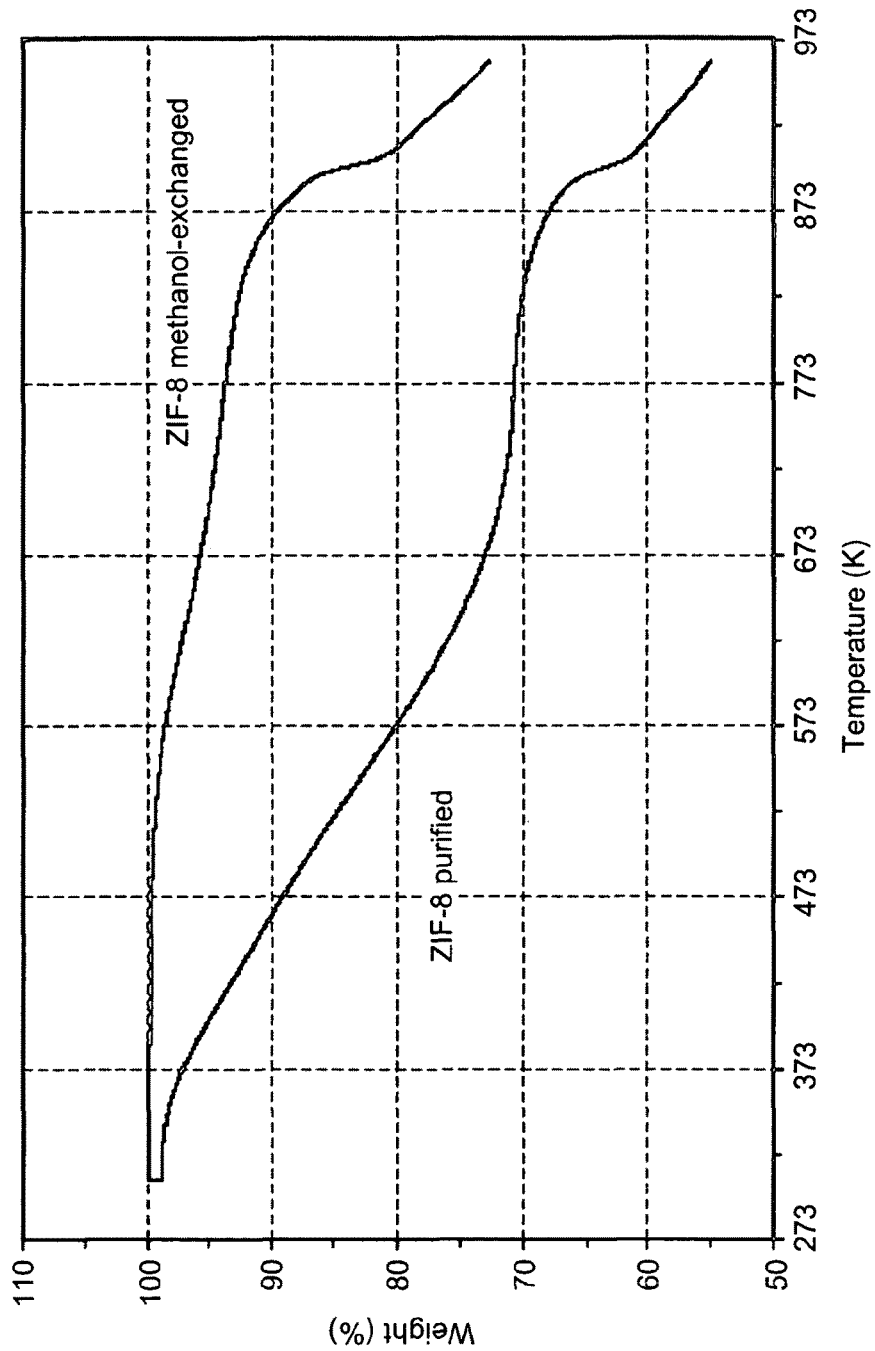
FIG. 10 shows the thermogravimetric analyses ("TGA"s) for the purified and methanol-exchanged ZIF-8 samples of Example 5 herein.

FIG. 10 shows the thermogravimetric analyses ("TGA") for the purified and the methanol-exchanged ZIF-8 samples in nitrogen atmosphere. The activation conditions described above were chosen based on TGA data.

Figure 24:
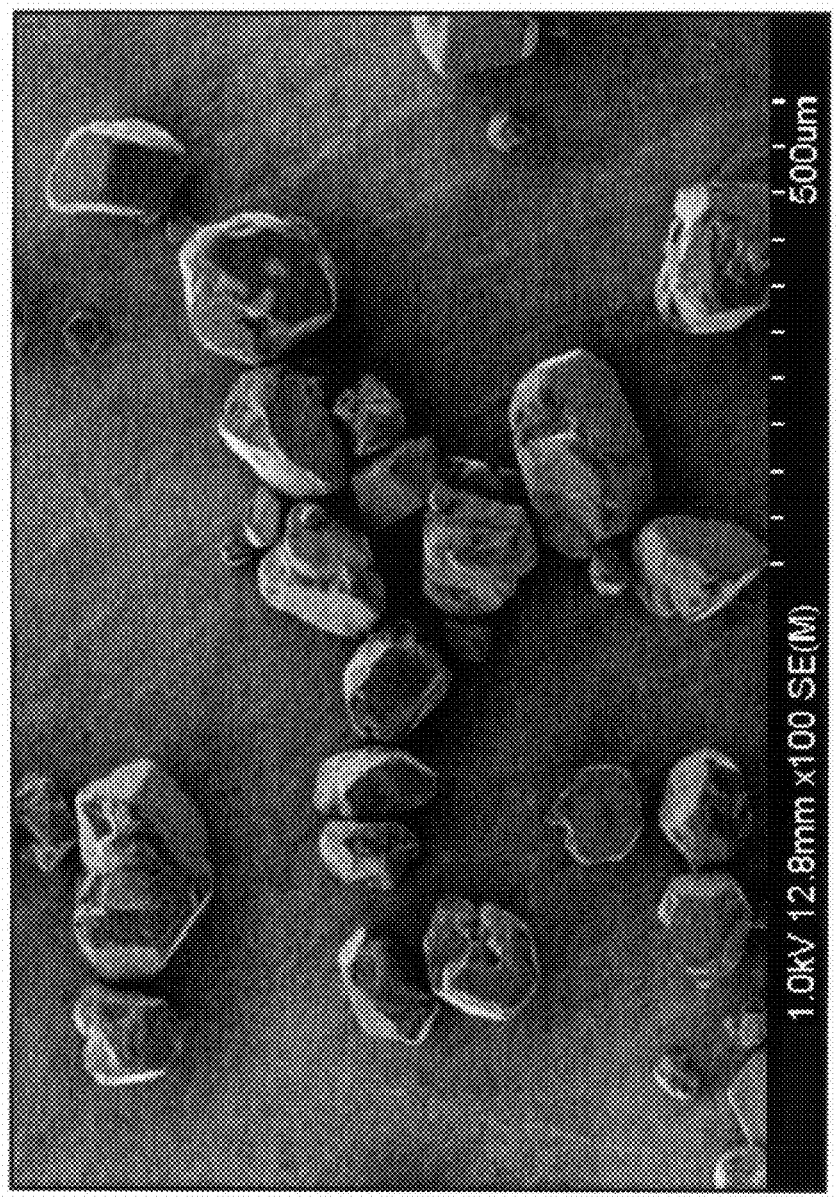
FIG. 24 is a Scanning Electron Microscopy ("SEM") image of a ZIF-8 sample of Example 10.

FIG. 24 is a Scanning Electron Microscopy ("SEM") image of a sample of ZIF-8 produced.

Examples 6-10

In Examples 6 through 10 herein, a Cahn® microbalance apparatus (TG121, 0.1 μg) was used to gravimetrically characterize the adsorption/desorption properties of hydrogen and hydrocarbons (i.e., adsorbates) in various zeolitic imidazolate frameworks (i.e., adsorbents). Experiments were carried out on various adsorbate-adsorbent pairs to determine the adsorption isotherms for the various ZIF materials synthesized in Examples 1 through 5 above. At a constant temperature, the equilibrium hydrocarbon adsorbate loading was measured at various adsorbate pressures up to 106.6 kPa. In order to capture any potential hysteretic behavior, for each isotherm half of the experimental points were measured in the adsorption mode (i.e., increasing the pressure from vacuum to the maximum pressure of 106.6 kPa) and the other half of the experimental points were measured in the desorption mode (i.e., decreasing the pressure from the maximum pressure of 106.6 kPa to vacuum). In all experiments, a LabVIEW® computer software was used to automatically set, control and monitor the sequence of steps followed in each experiment.

The adsorbate feed was brought into the feed manifold from lecture bottles or from house supply lines containing high purity gases and hydrocarbons. The feed manifold was in contact with the adsorbent located in the sample holder of the microbalance. The adsorbate pressure within the feed manifold was controlled between vacuum and 106.6 kPa by a MKS® Type 146 Measurement and Control System, which was connected to the computer via RS232 communications. The feed manifold was equipped with three MKS® 120A pressure transducers (0-0.0133 kPa, 0-1.33 kPa and 0-133 kPa) that provided the adsorbate pressure information to the controller. The controller actuated two electronic valves to adjust the adsorbate pressure within the feed manifold. One valve (MKS 0248A, Type 10000RK) was connected to the adsorbate feed supply and the other valve (MKS 0248A, Type 10000RV) was connected to the vacuum line. A Pfeiffer® TSU 261 turbomolecular pump was used to achieve the vacuum conditions.

Typically, prior to the hydrocarbon adsorption isotherm measurements, about 15-90 mg of adsorbent was loaded in the microbalance at 301 K. In order to avoid the contacting of the adsorbent with ambient air, the adsorbent was fully immersed in an excess of a specified solvent (i.e., an amount well in excess of that required to fill its internal pore volume). The solvent was removed through the use of dynamic vacuum. In some cases, where the solvent was held more strongly within the interior of the adsorbate, heating was also used. Typically, the following steps (all under dynamic vacuum) were applied: (a) out-gassing at 301 K for a prescribed duration, (b) heating to a prescribed temperature and kept there for a prescribed duration, (c) cooling to 301 K. Because the microbalance was tare just prior to loading the sample, the dry weight was directly obtained from the microbalance upon completion of the clean-up procedure. The type of solvent, the heating temperature as well as the duration of the steps was dependent on the particular ZIF material under study. For a given ZIF sample, the same clean-up steps were repeated each time a new successive experiment was conducted. Prior to removing the sample from the microbalance, the first and/or second adsorption experiments were repeated. These repeat experiments revealed excellent reproducibility, confirming the adequacy of the experimental adsorption isotherm procedures as well as the stability of the samples throughout the adsorption experiments. X-ray measurements of the removed samples further confirmed their integrity.

To measure the adsorption properties of the ZIFs for hydrogen as an adsorbate in Examples 6-10, the same basic steps as described above for the hydrocarbons were followed with the general exception that multiple hydrogen adsorption points were not measured between vacuum and 106.6 kPa. Instead, the hydrogen adsorption for each of the ZIF adsorbents in Examples 6-10 was only measured at the full test pressure of 106.6 kPa. Tests to measure the hydrogen desorption properties of the ZIFs were not performed.

Example 6

In this example, adsorption experiments were carried out on ZIF-7 samples obtained from the synthesis detailed in Example 1 above in compliance with the general testing procedures for Examples 6-10 described above.

Figure 12:
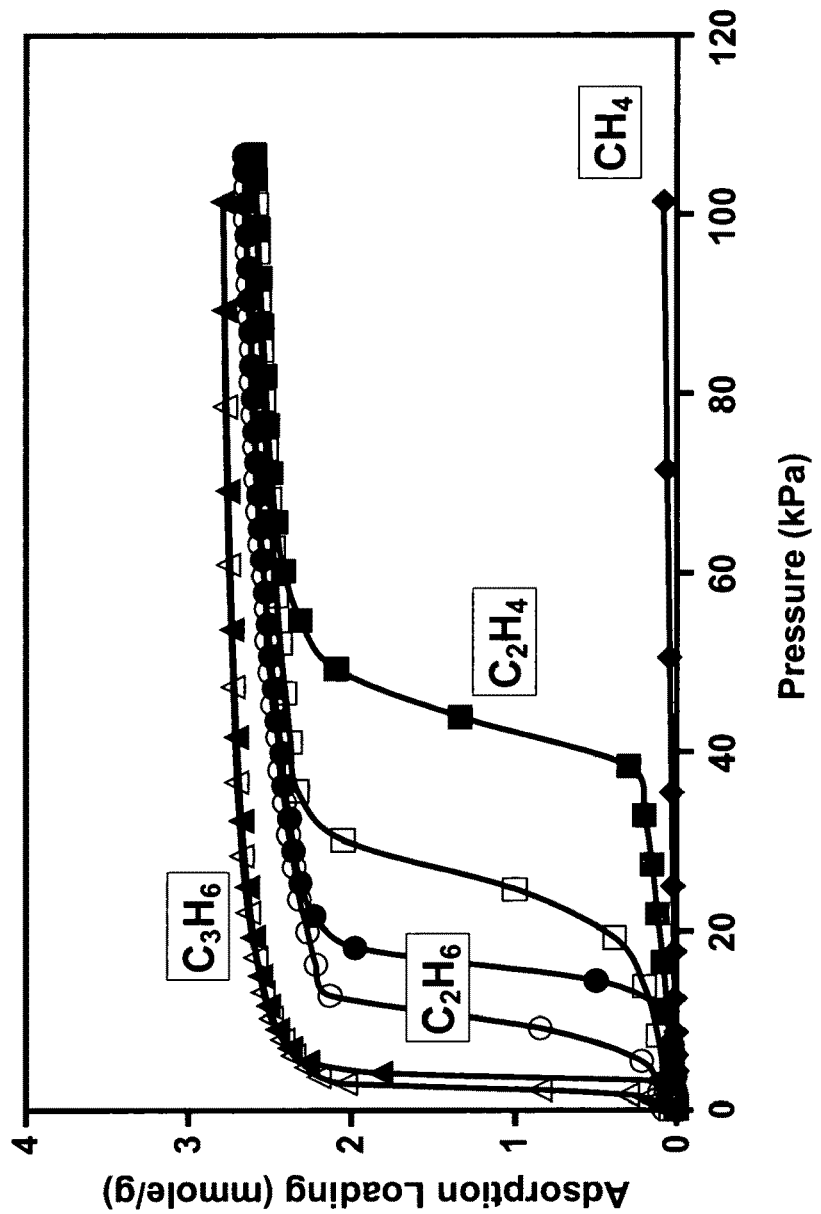
FIG. 12 shows the $CH_4$ (methane), $C_2H_4$ (ethylene), $C_2H_6$ (ethane), and $C_3H_6$ (propylene) adsorption isotherms at 301 K for a ZIF-7 sample of Example 6.

For the testing of each hydrocarbon adsorbate in this experiment, a sample of ZIF-7 was loaded with acetonitrile as the solvent. It was out-gassed for 6 hrs at 301 K under dynamic vacuum. No further heating was applied. The dry weight was 46.68 mg. The same clean-up procedure was applied to ZIF-7 prior to all subsequent experiments with other adsorbates. A Scanning Electron Microscopy ("SEM") image of this sample is shown in FIG. 11. FIG. 12 shows the adsorption isotherms for $CH_4$ (methane), $C_2H_4$ (ethylene), $C_2H_6$ (ethane), and $C_3H_6$ (propylene) on ZIF-7 at 301 K. The ordinate displays the equilibrium adsorption loading in typical units of mmole/g. The abscissa displays the absolute $C_2H_4$ pressure in kPa. The filled and open symbols identify the corresponding adsorption and desorption branches, respectively (the adsorption branch is shown with filled diamond legend and the desorption branch is shown with open diamond legend). In the testing regime of this example, methane did not exhibit the separate adsorption and desorption branches as was exhibited for the $C_{2+}$ hydrocarbons and therefore, the adsorption and desorption curves for methane in this regime overlap for ZIF-7.

For the testing of hydrogen as the adsorbate in this experiment, a sample of ZIF-7 was prepared in the same manner as described above for the hydrocarbon adsorption/desorption measurements above. A hydrogen adsorption reading for ZIF-7 was taken only at full test pressure of 106.6 kPa. No hydrogen desorption tests for ZIF-7 were performed.

Figure 13:
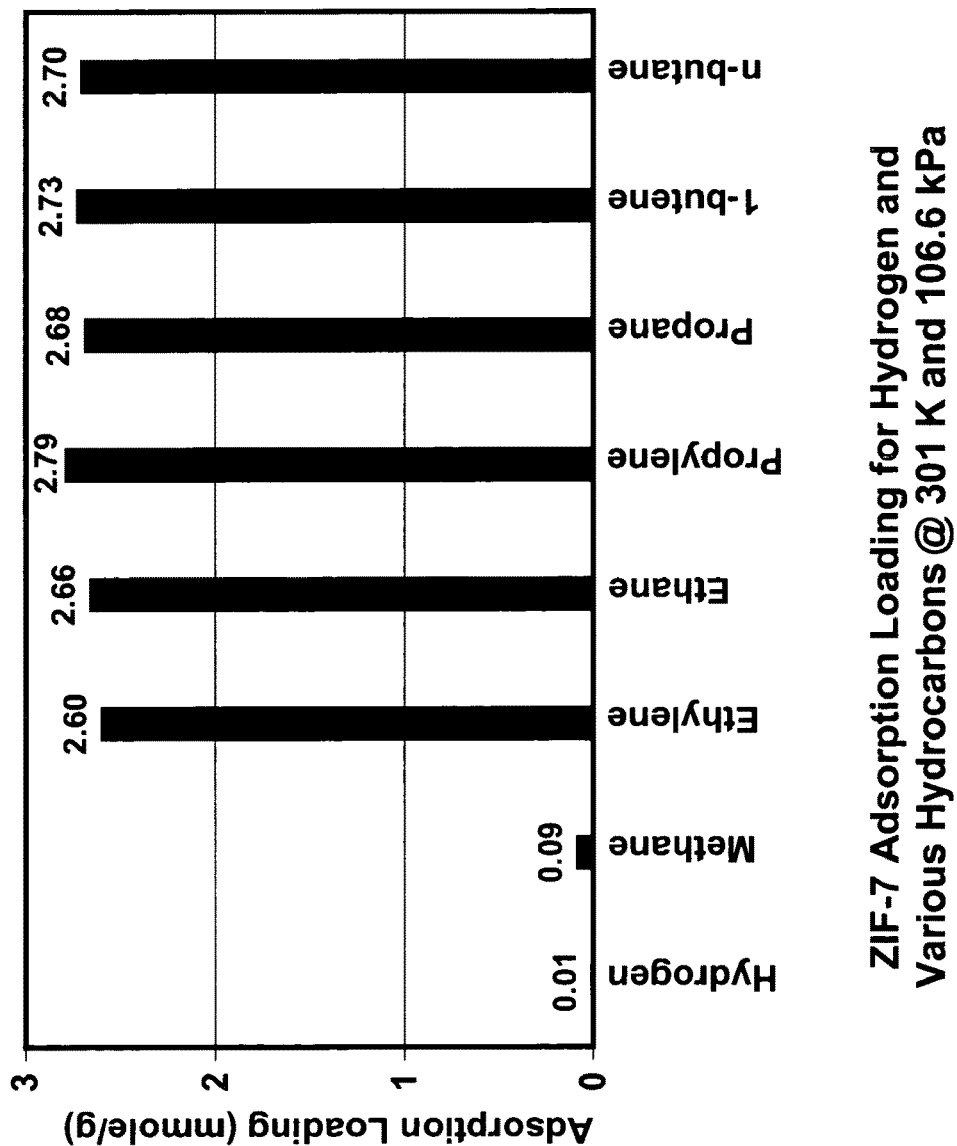
FIG. 13 is a bar graph comparing the adsorption loadings of a ZIF-7 sample of Example 6 for $H_2$ (hydrogen), $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at 301 K and 106.6 kPa.

FIG. 13 is a bar graph comparing the corresponding adsorption loadings of the ZIF-7 material for $H_2$ (hydrogen), $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at test conditions of 301 K and 106.6 kPa obtained from the tests as described above. As can be seen from this bar graph, the adsorption loadings of the ZIF-7 material for the $C_{2+}$ hydrocarbon compounds at 106.6 kPa @ 301 K were all greater than approximately 2.60 mmole/g. The adsorption loading for $CH_4$ was significantly lower at approximately 0.09 mmole/g. The measured hydrogen adsorbed was almost non-existent at only about 0.01 mmole/g. At these conditions, the adsorptive loading ratio for $CH_4$ over $H_2$ is approximately 9.0, illustrating a significant selectivity of the ZIF-7 material for $CH_4$ over $H_2$. However, even more remarkably, at these conditions, the adsorptive loading ratios for the $C_{2+}$ hydrocarbon compounds over $H_2$ are greater than approximately 260, illustrating the amazingly high selectivity of the ZIF-7 material for the $C_{2+}$ hydrocarbon compounds over $H_2$. These properties make ZIF-7 a suitable material for use in the present invention.

Example 7

In this example, adsorption experiments were carried out on ZIF-9 samples obtained from the synthesis detailed in Example 2 above in compliance with the general testing procedures for Examples 6-10 described above.

Figure 15:
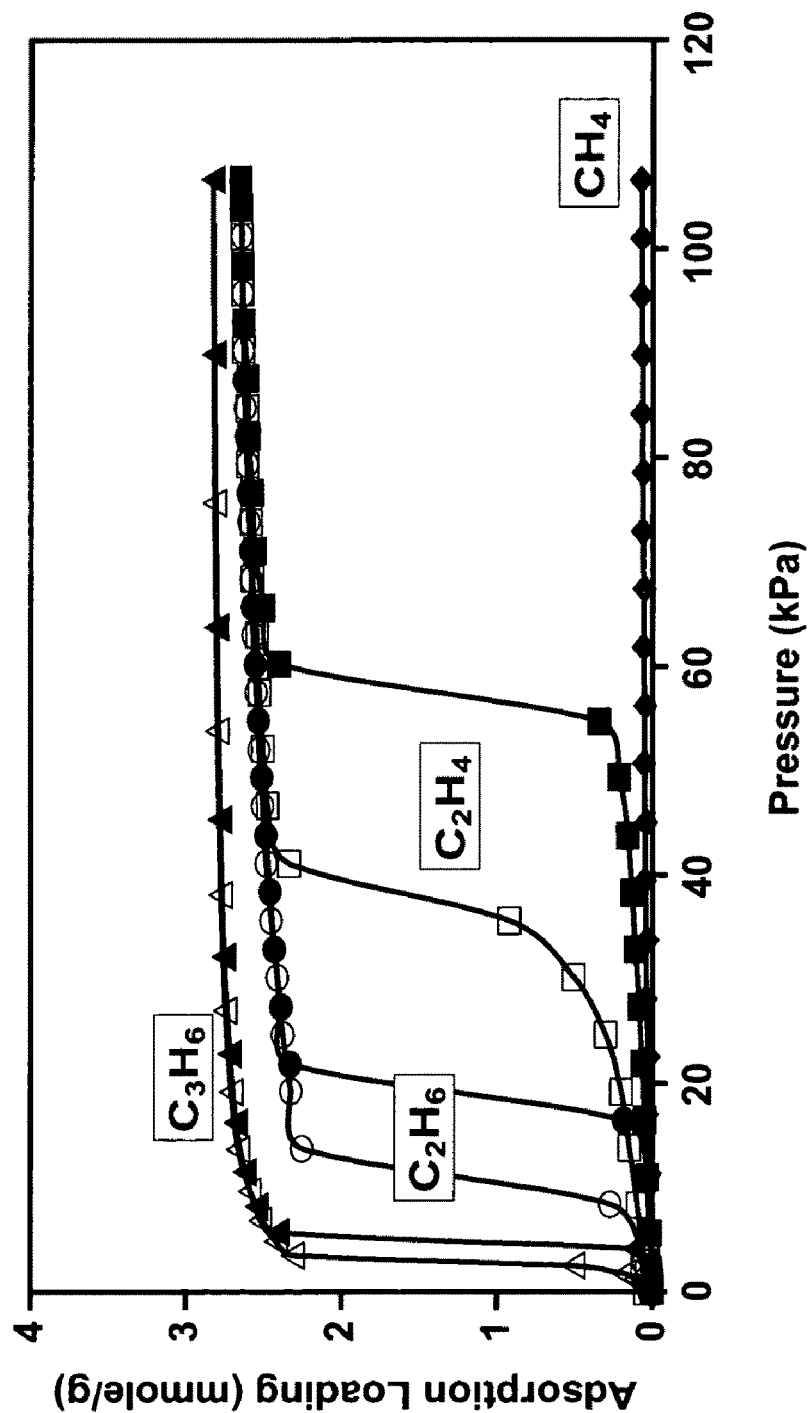
FIG. 15 shows the $CH_4$ (methane), $C_2H_4$ (ethylene), $C_2H_6$ (ethane), and $C_3H_6$ (propylene) adsorption isotherms at 301 K for a ZIF-9 sample of Example 7.

For the testing of each hydrocarbon adsorbate in this experiment, a sample of ZIF-9 was loaded with acetonitrile as the solvent. It was out-gassed for 6 hrs at 301 K under dynamic vacuum. No further heating was applied. The dry weight was 56.35 mg. The same clean-up procedure was applied to ZIF-9 prior to all subsequent experiments with other adsorbates. A Scanning Electron Microscopy ("SEM") image of this sample is shown in FIG. 14. FIG. 15 shows the adsorption isotherms for $CH_4$ (methane), $C_2H_4$ (ethylene), $C_2H_6$ (ethane), and $C_3H_6$ (propylene) on ZIF-9 at 301 K. The ordinate displays the equilibrium adsorption loading in typical units of mmole/g. The abscissa displays the absolute $C_2H_4$ pressure in kPa. The filled and open symbols identify the corresponding adsorption and desorption branches, respectively (the adsorption branch is shown with filled diamond legend and the desorption branch is shown with open diamond legend). In the testing regime of this example, methane did not exhibit the separate adsorption and desorption branches as was exhibited for the $C_{2+}$ hydrocarbons and therefore, the adsorption and desorption curves for methane in this regime overlap for ZIF-9.

For the testing of hydrogen as the adsorbate in this experiment, a sample of ZIF-9 was prepared in the same manner as described above for the hydrocarbon adsorption/desorption measurements above. A hydrogen adsorption reading for ZIF-9 was taken only at full test pressure of 106.6 kPa. No hydrogen desorption tests for ZIF-9 were performed.

Figure 16:
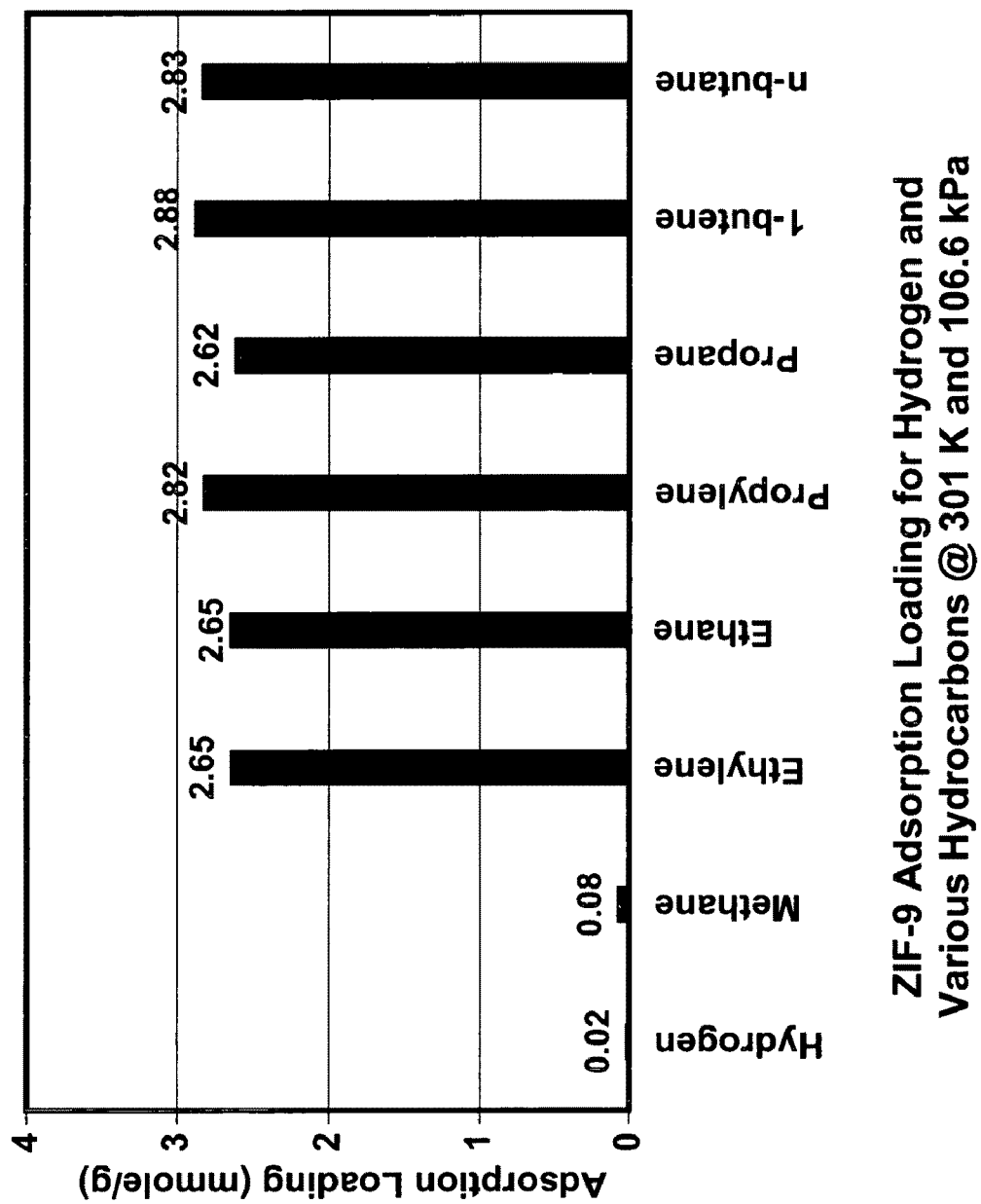
FIG. 16 is a bar graph comparing the adsorption loadings of a ZIF-9 sample of Example 7 for $H_2$ (hydrogen), $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at 301 K and 106.6 kPa.

FIG. 16 is a bar graph comparing the corresponding adsorption loadings of the ZIF-9 material for $H_2$ (hydrogen), $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at test conditions of 301 K and 106.6 kPa obtained from the tests above. As can be seen from this bar graph, the adsorption loading of the ZIF-9 material for the $C_{2+}$ hydrocarbon compounds at 106.6 kPa @ 301 K were all greater than approximately 2.62 mmole/g. The adsorption loading for $CH_4$ was significantly lower at approximately 0.08 mmole/g. The measured hydrogen adsorbed was almost nonexistent at only about 0.02 mmole/g. At these conditions, the adsorptive loading ratio for $CH_4$ over $H_2$ is approximately 4.0, illustrating a moderate selectivity of the ZIF-9 material for $CH_4$ over $H_2$. However, even more remarkably, at these conditions, the adsorptive loading ratios for the $C_{2+}$ hydrocarbon compounds over $H_2$ are greater than approximately 131.0, illustrating the amazingly high selectivity of the ZIF-9 material for $C_{2+}$ hydrocarbon compounds over $H_2$. This makes ZIF-9 a suitable material for use in the present invention.

Example 8

In this example, adsorption experiments were carried out on ZIF-1 samples obtained from the synthesis detailed in Example 3 above in compliance with the general testing procedures for Examples 6-10 described above.

For the testing of the acetonitrile-exchanged ZIF-1 sample, a portion of the ZIF-1 sample produced and activated as in Example 3 was loaded with acetonitrile as the solvent. It was out-gassed for 6 hrs at 301 K under dynamic vacuum. No further heating was applied. The dry weight was 69.64 mg. The same clean-up procedure was applied to the acetonitrile-exchanged ZIF-1 prior to all subsequent experiments with other adsorbates. A Scanning Electron Microscopy ("SEM") image of the acetonitrile-exchanged ZIF-1 sample is shown in FIG. 17.

For the testing of each hydrocarbon adsorbate on the toluene-exchanged ZIF-1 sample, a portion of the ZIF-1 sample produced and activated as in Example 3 was loaded with toluene as the solvent. It was out-gassed for 6 hrs at 301 K under dynamic vacuum, heated to 443 K for 2 hrs and then cooled to 301 K. The dry weight was 46.21 mg. The same clean-up procedure was applied to the toluene-exchanged ZIF-1 prior to all subsequent experiments with other adsorbates. A Scanning Electron Microscopy ("SEM") image of toluene-exchanged ZIF-1 sample is shown in FIG. 18.

Figure 19:
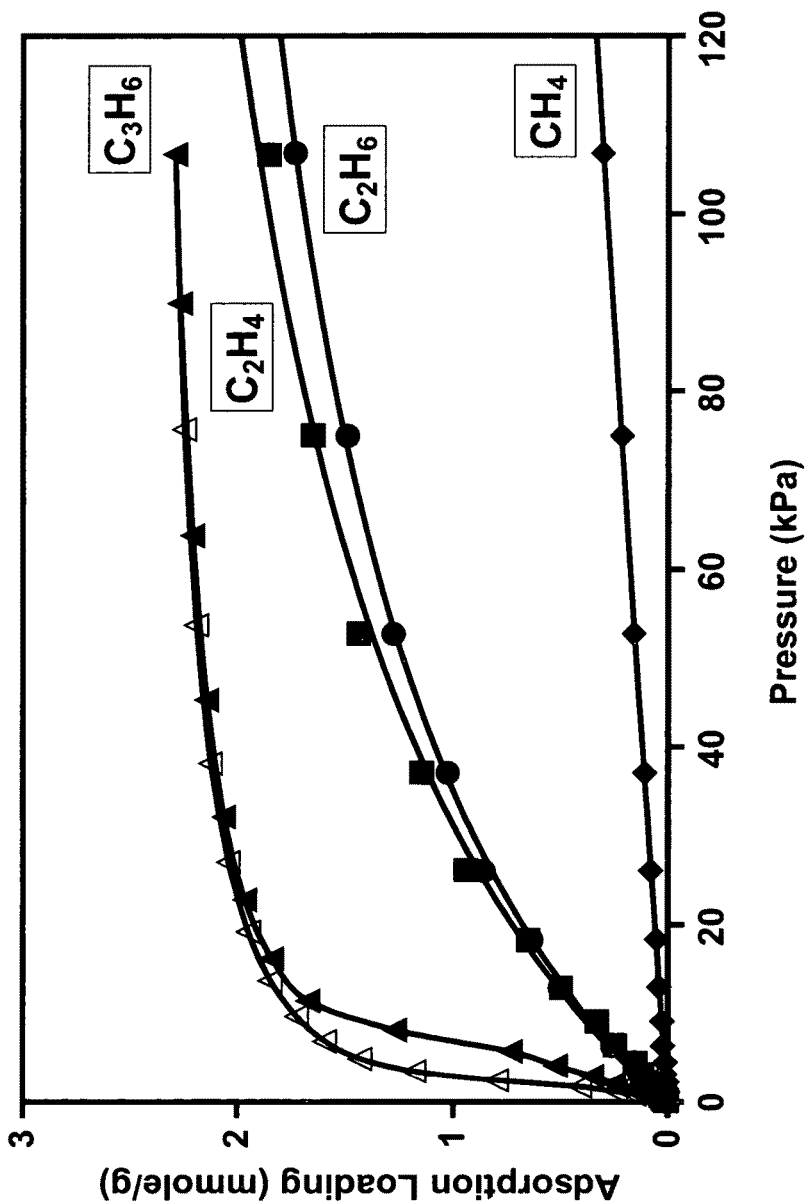
FIG. 19 shows the $CH_4$ (methane), $C_2H_4$ (ethylene), $C_2H_6$ (ethane), and $C_3H_6$ (propylene) adsorption isotherms at 301 K for a ZIF-1 (acetonitrile-exchanged) sample of Example 8.

FIG. 19 shows the adsorption isotherms of the acetonitrile-exchanged ZIF-1 for $CH_4$ (methane), $C_2H_4$ (ethylene), $C_2H_6$ (ethane), and $C_3H_6$ (propylene) at 301 K. The ordinate displays the equilibrium adsorption loading in typical units of mmole/g. The abscissa displays the absolute pressure of the adsorbate in kPa.

For the testing of hydrogen as the adsorbate in this experiment, a sample of acetonitrile-exchanged ZIF-1 was prepared in the same manner as described above for the hydrocarbon adsorption/desorption measurements above. A hydrogen adsorption reading for acetonitrile-exchanged ZIF-1 was taken only at full test pressure of 106.6 kPa. No hydrogen desorption tests for acetonitrile-exchanged ZIF-1 were performed.

Figure 20:
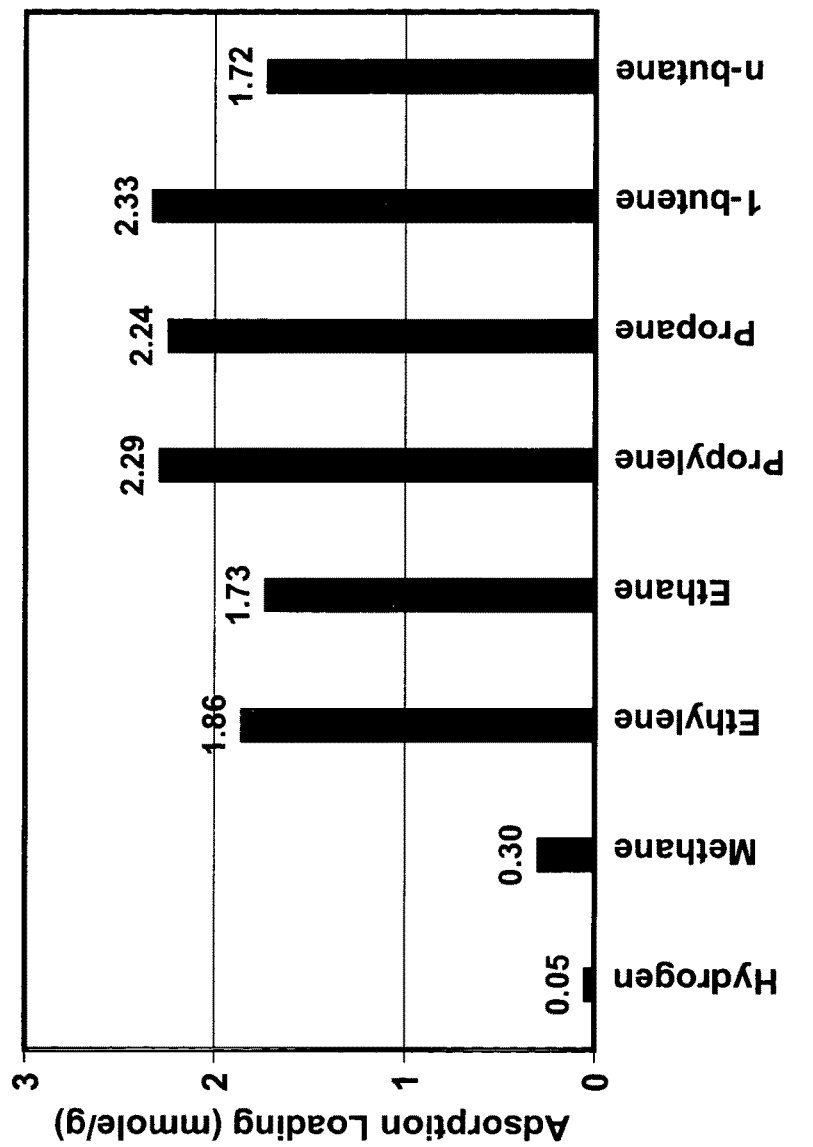
FIG. 20 is a bar graph comparing the adsorption loadings of a ZIF-1 (acetonitrile-exchanged) sample of Example 8 for $H_2$ (hydrogen), $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at 301 K and 106.6 kPa.

FIG. 20 is a bar graph comparing the corresponding adsorption loadings of the acetonitrile-exchanged ZIF-1 material for $H_2$ (hydrogen), $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at test conditions of 301 K and 106.6 kPa obtained from the tests above. As can be seen from this bar graph, the adsorption loadings of the acetonitrile-exchanged ZIF-1 material for the $C_{2+}$ hydrocarbon compounds at 106.6 kPa @ 301 K were all greater than approximately 1.73 mmole/g. The adsorption loading for $CH_4$ was approximately 0.30 mmole/g. The measured hydrogen adsorbed was only about 0.05 mmole/g. At these conditions, the adsorptive loading ratio for $CH_4$ over $H_2$ is approximately 6.0, illustrating a significant selectivity of the ZIF-1 material for $CH_4$ over $H_2$. However, even more remarkably, at these conditions, the adsorptive loading ratios for the $C_{2+}$ hydrocarbon compounds over $H_2$ were greater than approximately 34.6. This makes acetonitrile-exchanged ZIF-1 a suitable material for use in the present invention.

It should be noted that, although not shown, the toluene-exchanged ZIF-1 material exhibits similar adsorption loading characteristics as the acetonitrile-exchanged ZIF-1 material.

Example 9

In this example, adsorption experiments were carried out on ZIF-11 samples obtained from the synthesis detailed in Example 4 above in compliance with the general testing procedures for Examples 6-10 described above.

Figure 22:
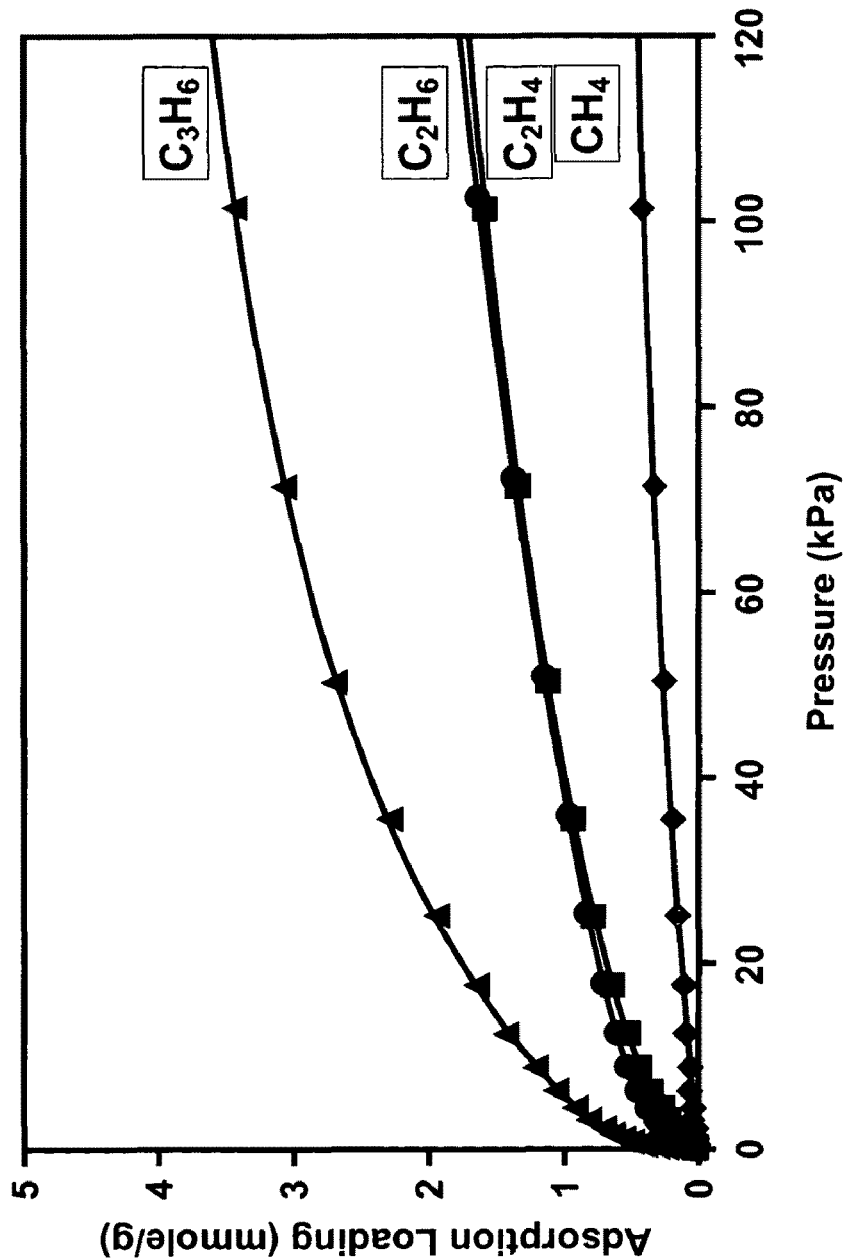
FIG. 22 shows the $CH_4$ (methane), $C_2H_4$ (ethylene), $C_2H_6$ (ethane), and $C_3H_6$ (propylene) adsorption isotherms at 301 K for a ZIF-11 sample of Example 9.

For the testing of each hydrocarbon adsorbate in this experiment, a sample of ZIF-11 was loaded with methanol as the solvent. It was out-gassed for 2 hrs at 301 K under dynamic vacuum, heated to 423 K for 3 hrs, and then cooled to 301 K. The dry weight was 82.07 mg. The same clean-up procedure was applied to ZIF-11 prior to all subsequent experiments with other adsorbates. A Scanning Electron Microscopy ("SEM") image of this sample is shown in FIG. 21. FIG. 22 shows the adsorption isotherms of ZIF-11 for $CH_4$ (methane), $C_2H_4$ (ethylene), $C_2H_6$ (ethane), and $C_3H_6$ (propylene) at 301 K. The ordinate displays the equilibrium adsorption loading in typical units of mmole/g. The abscissa displays the absolute pressure of the adsorbate in kPa.

For the testing of hydrogen as the adsorbate in this experiment, a sample of ZIF-11 was prepared in the same manner as described above for the hydrocarbon adsorption/desorption measurements above. A hydrogen adsorption reading for ZIF-11 was taken only at full test pressure of 106.6 kPa. No hydrogen desorption tests for ZIF-11 were performed.

Figure 23:
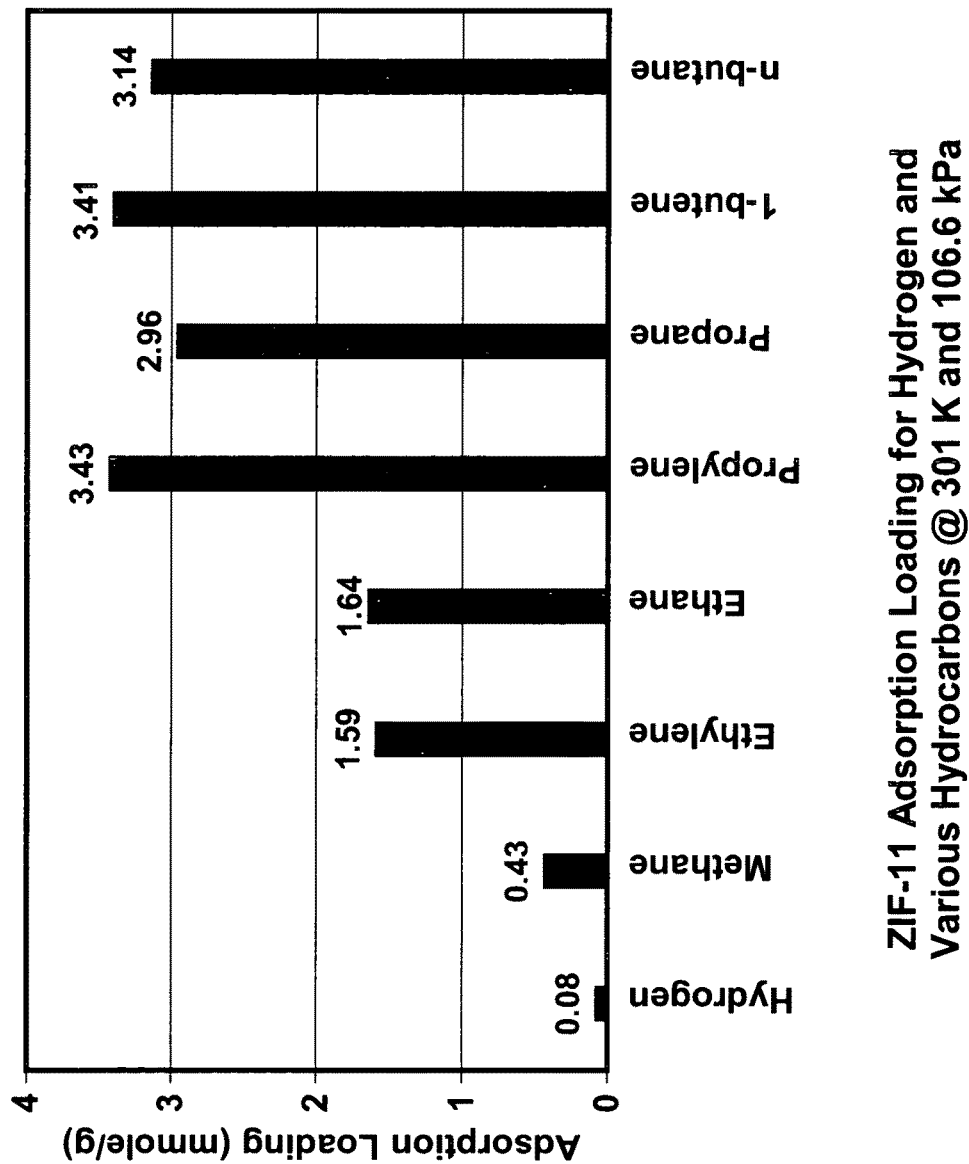
FIG. 23 is a bar graph comparing the adsorption loadings of a ZIF-11 sample of Example 9 for $H_2$ (hydrogen), $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at 301 K and 106.6 kPa.

FIG. 23 is a bar graph comparing the corresponding adsorption loadings of the ZIF-11 material for $H_2$ (hydrogen), $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at test conditions of 301 K and 106.6 kPa obtained from the tests above. As can be seen from this bar graph, the adsorption loadings of the ZIF-11 material for the $C_{2+}$ hydrocarbon compounds at 106.6 kPa @ 301 K were all greater than approximately 1.59 mmole/g. The adsorption loading for $CH_4$ was approximately 0.43 mmole/g. The measured hydrogen adsorbed was only about 0.08 mmole/g. At these conditions, the adsorptive loading ratio for $CH_4$ over $H_2$ is approximately 5.4, illustrating a significant selectivity of the ZIF-11 material for $CH_4$ over $H_2$. However, even more remarkably, at these conditions, the adsorptive loading ratios for the $C_{2+}$ hydrocarbon compounds over $H_2$ were all greater than approximately 19.9. This makes ZIF-11 a suitable material for use in the present invention.

Example 10

In this example, adsorption experiments were carried out on ZIF-8 samples obtained from the synthesis detailed in Example 5 above in compliance with the general testing procedures for Examples 6-10 described above.

Figure 25:
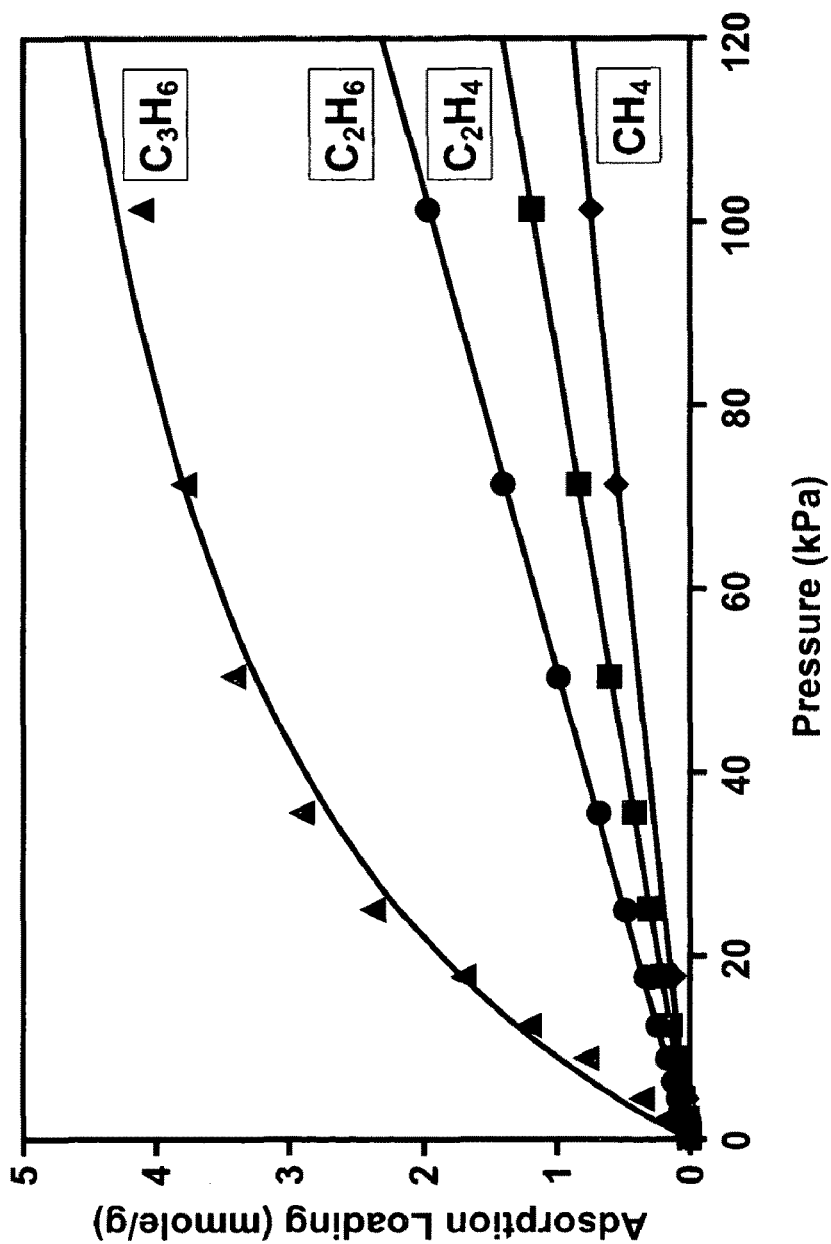
FIG. 25 shows the $CH_4$ (methane), $C_2H_4$ (ethylene), $C_2H_6$ (ethane), and $C_3H_6$ (propylene) adsorption isotherms at 301 K for a ZIF-8 sample of Example 10.

For the testing of each hydrocarbon adsorbate in this experiment, a sample of ZIF-8 was loaded with methanol as the solvent. It was out-gassed for 2 hrs at 301 K under dynamic vacuum, heated to 523 K for 3 hrs, and then cooled to 301 K. The dry weight was 16.37 mg. The same clean-up procedure was applied to ZIF-8 prior to all subsequent experiments with other adsorbates. A Scanning Electron Microscopy ("SEM") image of this sample is shown in FIG. 24. FIG. 25 shows the adsorption isotherms of ZIF-8 for $CH_4$ (methane), $C_2H_4$ (ethylene), $C_2H_6$ (ethane), and $C_3H_6$ (propylene) at 301 K. The ordinate displays the equilibrium adsorption loading in typical units of mmole/g. The abscissa displays the absolute pressure of the adsorbate in kPa.

For the testing of hydrogen as the adsorbate in this experiment, a sample of ZIF-8 was prepared in the same manner as described above for the hydrocarbon adsorption/desorption measurements above. A hydrogen adsorption reading for ZIF-8 was taken only at full test pressure of 106.6 kPa. No hydrogen desorption tests for ZIF-8 were performed.

FIG. 26 is a bar graph comparing the corresponding adsorption loadings of the ZIF-8 material for $H_2$ (hydrogen), $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at test conditions of 301 K and 106.6 kPa obtained from the tests above. It should be noted that the adsorption loadings for $C_3H_8$ (propane), $C_4H_8$ (1-butene), and $C_4H_{10}$ (n-butane) at full test pressure were allowed to equilibrate for 12 hours. As can be seen from this bar graph, the adsorption loadings of the ZIF-8 material for all of the hydrocarbon compounds at 106.6 kPa @ 301 K were all greater than approximately 0.74 mmole/g. The measured hydrogen adsorbed was essentially non-existent at about 0.00 mmole/g. Remarkably, at these conditions, the adsorptive loading ratio for all hydrocarbon components over $H_2$ nears infinity, illustrating an astonishing selectivity of the ZIF-8 material for hydrocarbons over $H_2$. This makes ZIF-8 not only a suitable material for use in the present invention, but a preferred material for use in the present invention.

What is claimed is:

1. A process for separating $H_2$ from a process feedstream, comprising:
    a) contacting an adsorbent material comprised of a zeolitic imidazolate framework material with a process feedstream comprising $H_2$ and at least one hydrocarbon compound at a first pressure and first temperature;
    b) adsorbing at least a portion of the hydrocarbon compound in the adsorbent material, thereby producing a $H_2$-rich product stream
    wherein the $H_2$-rich product stream has a higher concentration of $H_2$ by mol % than the process feedstream; and
    c) producing a $H_2$-lean product stream at a second pressure and second temperature, wherein the $H_2$-lean product stream has a lower concentration of $H_2$ by mol % than the process feedstream;
    wherein the zeolitic imidazolate framework material has a framework structure wherein each vertex of the framework structure is comprised of a single metal ion and each pair of connected adjacent vertices of the framework structure is linked by nitrogen atoms of an imidazolate anion or its derivative, and wherein the zeolitic imidazolate framework material has an adsorptive loading ratio for the hydrocarbon compound over $H_2$ of at least 5.

2. The process of claim 1, wherein the adsorbent material is further comprised of a binder material selected from the group consisting of a crystalline polymer, a non-crystalline polymer, an epoxy, a thermoplastic, a clay, a silica-containing material, an alumina-containing material, and a titania-containing material.

3. The process of claim 1, wherein the adsorptive loading ratio for the hydrocarbon compound over $H_2$ is measured at 301 K and 106.6 kPa.

4. The process of claim 1, wherein the zeolitic imidazolate framework material is selected from the group consisting of ZIF-1, ZIF-7, ZIF-8, ZIF-9, and ZIF-11.

5. The process of claim 4, wherein the zeolitic imidazolate framework material is selected from the group consisting of ZIF-1, ZIF-8, and ZIF-11.

6. The process of claim 1, wherein the zeolitic imidazolate framework material has an adsorptive loading ratio for the hydrocarbon compound over $H_2$ of at least 10.

7. The process of claim 4, wherein the $H_2$-rich product stream contains at least 70 mol % of the $H_2$ present in the process feedstream.

8. The process of claim 7, wherein the hydrocarbon compound partial pressure in step a) is greater than the hydrocarbon compound partial pressure in step d).

9. The process of claim 8, wherein the first pressure is greater than the second pressure.

10. The process of claim 8, wherein the second temperature is greater than the first temperature.

11. The process of claim 8, wherein the process is a swing adsorption process, wherein the overall swing adsorption cycle time is less than about 1 minute.

12. The process of claim 1, wherein hydrocarbon compound is selected from the group consisting of $CH_4$ (methane), C$_2$H$_4$ (ethylene), C$_2$H$_6$ (ethane), C$_3$H$_6$ (propylene), C$_3$H$_8$ (propane), C$_4$H$_8$ (1-butene), and C$_4$H$_{10}$ (n-butane).

13. The process of claim 1, wherein hydrocarbon compound is CH$_4$ (methane).

14. The process of claim 1, wherein the first pressure is less than 100 psia.

15. The process of claim 1, wherein the process feedstream is comprised of a steam reforming process product stream comprised of hydrogen and methane.

16. The process of claim 15, wherein the zeolitic imidazolate framework material is selected from the group consisting of ZIF-1, ZIF-8, and ZIF-11.

17. The process of claim 15, wherein the H$_2$-rich product stream contains at least 80 mol % of the H$_2$ present in the process feedstream.

18. The process of claim 15, wherein the H$_2$-rich product stream contains less than 30 mol % of the hydrocarbons present in the process feedstream.

19. The process of claim 1, wherein the process feedstream is comprised of a hydrogen-containing stream produced by a catalytic reforming process.

20. The process of claim 19, wherein the zeolitic imidazolate framework material is selected from the group consisting of ZIF-1, ZIF-8, and ZIF-11.

21. The process of claim 1, wherein the process feedstream is comprised of a hydrogen-containing feedstream to a hydrotreating process.

22. The process of claim 21, wherein the zeolitic imidazolate framework material is selected from the group consisting of ZIF-1, ZIF-8, and ZIF-11.

23. The process of claim 1, wherein the process feedstream is comprised of a refinery fuel gas.

24. The process of claim 23, wherein the first pressure is less than 100 psia.

25. The process of claim 24, wherein the zeolitic imidazolate framework material is selected from the group consisting of ZIF-1, ZIF-8, and ZIF-11.

26. The process of claim 1, wherein the process feedstream is comprised of a steam cracker product stream.

27. The process of claim 26, wherein the hydrocarbon compound is selected from the group consisting of ethylene and propylene.

28. The process of claim 27, wherein the zeolitic imidazolate framework material is selected from the group consisting of ZIF-1, ZIF-8, and ZIF-11.

* * * * *